(12) United States Patent
Rea Zanabria et al.

(10) Patent No.: US 10,237,587 B2
(45) Date of Patent: Mar. 19, 2019

(54) TRANSPORTING OUT-OF-BAND SIGNALS IN DISTRIBUTED CABLE SYSTEMS

(71) Applicant: Alcatel-Lucent USA Inc., Murray Hill, NJ (US)

(72) Inventors: Gino Pedro Enrique Rea Zanabria, Milpitas, CA (US); Martinus Bos, San Jose, CA (US)

(73) Assignee: NOKIA OF AMERICA CORPORATION, Murray Hill, NJ (US)

(*) Notice: Subject to any disclaimer, the term of this patent is extended or adjusted under 35 U.S.C. 154(b) by 0 days.

(21) Appl. No.: 15/618,155

(22) Filed: Jun. 9, 2017

(65) Prior Publication Data

US 2017/0359600 A1 Dec. 14, 2017

Related U.S. Application Data

(60) Provisional application No. 62/348,744, filed on Jun. 10, 2016.

(51) Int. Cl.
| | |
|---|---|
| *H04N 21/2343* | (2011.01) |
| *H04N 21/4402* | (2011.01) |
| *H04N 21/6405* | (2011.01) |
| *H04N 21/434* | (2011.01) |
| *H04B 10/2575* | (2013.01) |
| *H04N 21/643* | (2011.01) |

(52) U.S. Cl.
CPC ... *H04N 21/2343* (2013.01); *H04B 10/25751* (2013.01); *H04N 21/4343* (2013.01); *H04N 21/4402* (2013.01); *H04N 21/643* (2013.01); *H04N 21/6405* (2013.01)

(58) Field of Classification Search
None
See application file for complete search history.

(56) References Cited

U.S. PATENT DOCUMENTS

| | | | | | |
|---|---|---|---|---|---|
| 5,488,413 | A | * | 1/1996 | Elder | H04N 7/10 348/E7.049 |
| 6,643,295 | B1 | * | 11/2003 | Nose | H04J 3/0682 348/E7.07 |
| 7,630,357 | B2 | * | 12/2009 | Currivan | H04J 3/0682 370/335 |
| 7,904,932 | B2 | * | 3/2011 | Dounaevski | H04N 7/102 370/497 |

(Continued)

OTHER PUBLICATIONS

PCT/US2017/036947. Int'l Search Report & Written Opinion (dated Sep. 22, 2017).

*Primary Examiner* — An Son P Huynh
(74) *Attorney, Agent, or Firm* — Loza & Loza, LLP; Jessica W. Smith

(57) ABSTRACT

A distributed CATV system that transports out-of-band signals between the cable headend and the set-top boxes is described. A video engine in the headend of the distributed CATV system converts downstream video channel RF (radio frequency) signals and downstream out-of-band RF signals respectively into video downstream packets and out-of-band downstream packets for a set of distribution nodes to transmit to the set-top boxes via CATV cables. The video engine also receives upstream packets from the distribution nodes that contain data based on upstream out-of-band RF signals transmitted by the set-top boxes via CATV cables.

18 Claims, 15 Drawing Sheets

(56) References Cited

U.S. PATENT DOCUMENTS

| | | | |
|---|---|---|---|
| 9,209,898 B1* | 12/2015 | Schemmann | H04B 10/2503 |
| 2002/0007494 A1* | 1/2002 | Hodge | H04L 12/2801 |
| | | | 725/109 |
| 2002/0126685 A1* | 9/2002 | Leatherbury | H04N 21/6118 |
| | | | 370/432 |
| 2002/0136231 A1* | 9/2002 | Leatherbury | H04L 12/2801 |
| | | | 370/442 |
| 2002/0157103 A1* | 10/2002 | Song | H04N 7/17318 |
| | | | 725/97 |
| 2003/0063843 A1* | 4/2003 | Horne | H04J 3/0655 |
| | | | 385/24 |
| 2003/0154494 A1* | 8/2003 | Sage | H04N 7/17309 |
| | | | 725/120 |
| 2003/0174700 A1* | 9/2003 | Ofek | H04L 47/10 |
| | | | 370/389 |
| 2004/0223578 A1* | 11/2004 | Lagarde | H03L 7/0994 |
| | | | 375/376 |
| 2006/0056461 A1* | 3/2006 | Currivan | H04J 3/0682 |
| | | | 370/503 |
| 2007/0015529 A1* | 1/2007 | Choi | H04W 52/286 |
| | | | 455/522 |
| 2007/0195817 A1* | 8/2007 | Denney | H04J 3/1682 |
| | | | 370/468 |
| 2007/0274227 A1* | 11/2007 | Rauscher | H04L 43/0858 |
| | | | 370/252 |
| 2008/0235746 A1* | 9/2008 | Peters | H04N 7/17318 |
| | | | 725/111 |
| 2009/0245249 A1* | 10/2009 | Suzuki | H04L 12/18 |
| | | | 370/390 |
| 2011/0145854 A1* | 6/2011 | Bacon | H04N 21/262 |
| | | | 725/31 |
| 2011/0317979 A1* | 12/2011 | Smith | H04N 21/47217 |
| | | | 386/241 |
| 2012/0137319 A1* | 5/2012 | Schooling | H04H 20/40 |
| | | | 725/16 |
| 2012/0240147 A1* | 9/2012 | Rodriguez | H04N 7/17318 |
| | | | 725/25 |
| 2013/0028265 A1* | 1/2013 | Ronchetti | H04L 43/0858 |
| | | | 370/400 |
| 2013/0044766 A1* | 2/2013 | Pantelias | H04W 28/20 |
| | | | 370/468 |
| 2013/0276047 A1* | 10/2013 | Chapman | H04N 21/42676 |
| | | | 725/111 |
| 2014/0029406 A1* | 1/2014 | Liang | H04J 3/10 |
| | | | 370/201 |
| 2014/0119281 A1* | 5/2014 | Kummetz | H04L 1/00 |
| | | | 370/328 |
| 2014/0137177 A1 | 5/2014 | Rakib | |
| 2014/0380384 A1* | 12/2014 | Turrie | H04L 67/34 |
| | | | 725/100 |
| 2015/0052572 A1 | 2/2015 | Schemann | |
| 2015/0092789 A1* | 4/2015 | Li | H04W 56/00 |
| | | | 370/437 |
| 2017/0237489 A1* | 8/2017 | Zhang | H04B 10/2503 |
| | | | 398/36 |

* cited by examiner

TRANSPORTING OUT-OF-BAND SIGNALS IN DISTRIBUTED CABLE SYSTEMS

CLAIM OF BENEFIT TO PRIOR APPLICATIONS

The present Application claims the benefit of U.S. Provisional Patent Application 62/348,744, titled "Transporting Out-Of-Band Signals in Distributed Cable Systems", filed Jun. 10, 2016. U.S. Provisional Patent Application 62/348,744 is incorporated herein by reference.

BACKGROUND

Cable television (CATV), originally introduced in the late 1940's as a way to transmit television signals by coaxial cables to houses in areas of poor reception, has over the years been modified and extended to enable the cable medium to transport a growing number of different types of digital data, including both digital television and broadband Internet data.

One of the most significant improvements occurred in the 1990's, when a number of major electronics and cable operator companies, working through CableLabs, a non-profit R&D consortium, introduced the Data Over Cable Service Interface Specification (DOCSIS). First introduced in the late 1990's as DOCSIS version 1.0, and upgraded many times since (currently at DOCSIS version 3.0, with a draft DOCSIS 3.1 specification released in 2013), the DOCSIS standard defines the Physical Layers (PHY) and Media Access Control (MAC) layers needed to send relatively large amounts of digital data through coaxial cables that were originally designed to handle analog standard definition television channels.

This television signal was transmitted as a combination amplitude modulated signal (for the black and white portion), quadrature-amplitude modulated signal (for the color portion), and frequency modulated signal (for the audio portion), and this combined signal will be designated as a Frequency Division Multiplexed (FDM) signal. With the advent of digital television and high definition television standardization in the late 1980's and early 1990's, the basic 6 MHz bandwidth spectrum of analog television was retained, but the modulation scheme was changed to a more sophisticated and higher data rate Quadrature Amplitude Modulation (QAM) scheme, which can encode digital information onto a very complex QAM analog signal (waveform).

The DOCSIS standard was built upon this analog and digital TV foundation, and specified additional standards to provide broadband Internet services (Internet protocols, or IP), voice over IP, custom video on demand, and other modern services based upon the QAM data transmission waveforms previously established for digital and high definition television.

As a result, simple coaxial cables have been gradually upgraded to accommodate ever-increasing demands for digital data. At each house (or apartment, office, store, restaurant or other location), the household connects to the CATV cable by a cable modem and uses the cable modem to extract downstream DOCSIS digital data (frequently used for high-speed Internet), and inject upstream DOCSIS digital data (again, frequently used for high-speed Internet applications).

Unfortunately, even in a coax cable, there is a finite amount of bandwidth available to transmit data. Coax cables and their associated radiofrequency interface equipment have typically only used the frequency range under about 1000 MHz, and so there are limits to how much data the 1950's era coaxial cable can ultimately transmit. By contrast, optical fiber (fiber optics, fiber) technology, which uses much higher optical frequencies (with wavelengths typically in the 800-2000 nanometer range), can transmit a much higher amount of data. Optical fiber data rates typically are in the tens or even hundreds of gigabits per second. Indeed, the entire RF CATV cable spectrum from 0 to 1000 MHz can be converted to optical wavelengths (such as 1310 nm or 1550 nm), be carried over an optical fiber, and then be converted back to the full RF CATV cable spectrum at the other end of the fiber, without coming close to exhausting the ability of the optical fiber to carry additional data. This conversion process can be achieved by relatively simple optical to digital or digital to optical converters, in which the CATV RF waveforms are simply converted back and forth to a light signal by simple ("dumb") E/O or O/E converters located in nodes that connect optical fibers to CATV cable (fiber nodes).

Optical fiber technology has been widely used for high capacity computer networks, and these networks often do not use the DOCSIS protocols or QAM protocols to transmit data. Rather, these high capacity computer networks often use entirely different types of data transmission protocols, such as the Ethernet protocols IEEE 802.3ah, 1000 BASE-LX10, 1000 Base-BX10, and others. These networks and protocols are often referred to as GigE networks, which is an abbreviation of the Gigabit speeds and Ethernet protocols used for fiber based computer networks. Thus if a user desires to transfer computer data from RF QAM waveforms transported over a CATV cable to a high speed GigE fiber network, the data must be transformed back and forth between the DOCSIS cable QAM waveforms and the alternate protocols (often Ethernet protocols) used in fiber GigE networks.

Although ideally, the best way to satisfy the ever increasing household demand for digital data (e.g. video on demand, high speed Internet, voice over IP, etc.) would be by extending optical fiber to each household, this would be an incredibly expensive solution. By contrast, cable based CATV solutions have already been implemented for tens of millions of households, and this expense has already been borne and amortized over decades of use, starting from the 1950s. As a result, it is far more economically attractive to find schemes enable the existing, if bandwidth limited, CATV cable system to be further extended to meet the ever-growing demands for additional data.

SUMMARY

In some embodiments, a distributed CATV system includes a packet engine for routing packets of the CATV system, a video engine for providing media content in the cable system, and a set of distribution nodes that are communicatively coupled with the video engine and the packet engine through a digital communications medium. Each distribution node is in turn communicatively coupled with a corresponding set of user end devices such as set-to-boxes, cable modems that consumes information provided through a RF communications medium. In some embodiments, the digital communications medium coupling the set of distribution nodes with the packet engine and the video engine supports digital packet traffic.

In some embodiments, the distributed CATV system transports out-of-band signals between the cable headend and the set-top boxes. In some embodiments, the video engine converts downstream video channel RF (radio frequency) signals and downstream out-of-band RF signals respectively into video downstream packets and out-of-band downstream packets for a set of distribution nodes to transmit to the set-top boxes via CATV cables. The video engine also receives upstream packets from the distribution nodes that contain data based on upstream out-of-band RF signals transmitted by the set-top boxes via CATV cables.

In some embodiments, the video engine includes an ADC for sampling the downstream out-of-band signal at the headend. In order to use the bandwidth or data carrying capacity of the distribution network efficiently, some embodiments reduces the number of samples (decimation or down-sampling) to what is sufficient (or minimally required) for recording the information carried by the out-of-band channel. The reduced sample data are then stored as packets and transmitted downstream to the distribution nodes through the data distribution network. A distribution node upon receiving the downstream packet extracts the out-of-band data from the packet and reconstitutes the out-of-band downstream RF waveforms for transmission over a CATV cable by up-sampling the extracted out-of-band channel data from the lower baseband rate. In some embodiments, the up-sampled data rate matches ADC sampling rate at the video engine. In some embodiments, the interpolators at the distribution node are configured to exactly undo the effect of the decimators at the video engine. In some embodiments, the decimator in the video engine includes a number of stages, and the distribution node would have the same number stages of corresponding interpolator stages to match and undo the operations performed by the decimator.

In some embodiments, the upstream datapath of a distribution node detects whether there is a valid upstream out-of-band data coming from CATV cable. The distribution node would generate and produce packet to the cable headend/video engine only if there is a valid packet to be sent. This conserves power at the distribution node as well as bandwidth at the distribution network. In some embodiments, the distribution node detects the presence of valid packet by detecting energy in the RF waveform samples by using a high-resolution FFT and power calculation on the resulting frequency bins. The distribution node would transmit an upstream IP packet to the video engine only when signal energy indicative of actual upstream data is detected, otherwise the distribution node would mute its transmitter to the distributed network (10 G/Fiber).

In order to ensure that the outgoing sample rate equals the incoming sample rate at the distribution nodes and at the video engine, (otherwise, over time, the transmitting device would either accumulate samples and overflow, or run out of samples and underflow,) some embodiments synchronize the clocks of the different devices in the distributed CATV system. In some embodiments, the video engine and the distribution nodes operate off different clocks. One of the devices in the cable system serve as the master device for maintaining a master clock and for sending clock synchronization information that allow slave devices to synchronize their local clocks with the master clock. In some embodiments, the clock synchronization information are delivered by highest priority packets in the cable system and using protocols such as Precision Time Protocol (PTP).

In some embodiments, the video engine has a delay equalization buffer (or jitter buffer) that can be configured to insert the requisite delay offset in order to remove the jitter of upstream IP packets. In some embodiments, the delay equalization buffer of the video engine equalizes the delays of upstream packets over the distribution network from each of the distribution nodes. In some embodiments, the jitter buffer temporarily stores each upstream packet until a scheduled time that is computed to equalize the delays among the different distribution nodes. In some embodiments, each packet is associated with a timestamp, and the scheduled time to remove the packet from buffer (for transmission) is computed based on the packet's timestamp and the equalized delay. In some embodiments, the distribution node that sends the packet upstream to the headened/video engine also inserts the timestamp into the packet.

In some embodiments, the delay equalization buffer at the headend/video engine has a storage for storing packets from different sources and a scheduler for determining when to retrieve a packet for transmission. The scheduler uses a clock that is synchronized with the distribution nodes in the CATV system (e.g., through PTP protocol) so the retrieval of packets for transmission by different distribution nodes/video engine can be precisely timed to equalize delay or remove jitter.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

In a conventional or legacy CATV (cable television) system, out-of-band RF frequencies over CATV cables are used for carrying control signals such as TV guide information. These out-of-band signals are transmitted as RF waveforms between the headend of the CATV system and the set-top boxes over the CATV cable. A distributed CATV system differs with the legacy CATV system in that the headend of a distributed CATV system is not in direct RF communication with the user end cable modems. Rather, the headend of the distributed CATV system is in high-speed digital communication with a set of distribution nodes, and the set of distribution nodes in turn communicate with cable modems or cable set-top box over CATV cables in the field. Some embodiments of the invention provide methods and apparatus for transporting out-band-signals in a distributed cable system between the headend of the CATV system and information or service consuming devices at the user end of the CATV system.

In some embodiments, a distributed CATV system includes a packet engine for routing packets of the CATV system, a video engine for providing media content in the cable system, and a set of distribution nodes that are communicatively coupled with the video engine and the packet engine through a digital communications medium. Each distribution node is in turn communicatively coupled with a corresponding set of user end devices such as set-to-boxes, cable modems that consumes information provided through a RF communications medium. In some embodiments, the digital communications medium coupling the set of distribution nodes with the packet engine and the video engine supports digital packet traffic. The video engine converts downstream video channel RF (radio frequency) signals and downstream supplementary channel RF signals respectively into video downstream packets and supplementary downstream packets for the set of distribution nodes over the digital communications medium. Each distribution node converts upstream supplementary channel RF signals received from its corresponding RF communications medium into supplementary upstream packets for transmission to the video engine.

Figure 1:
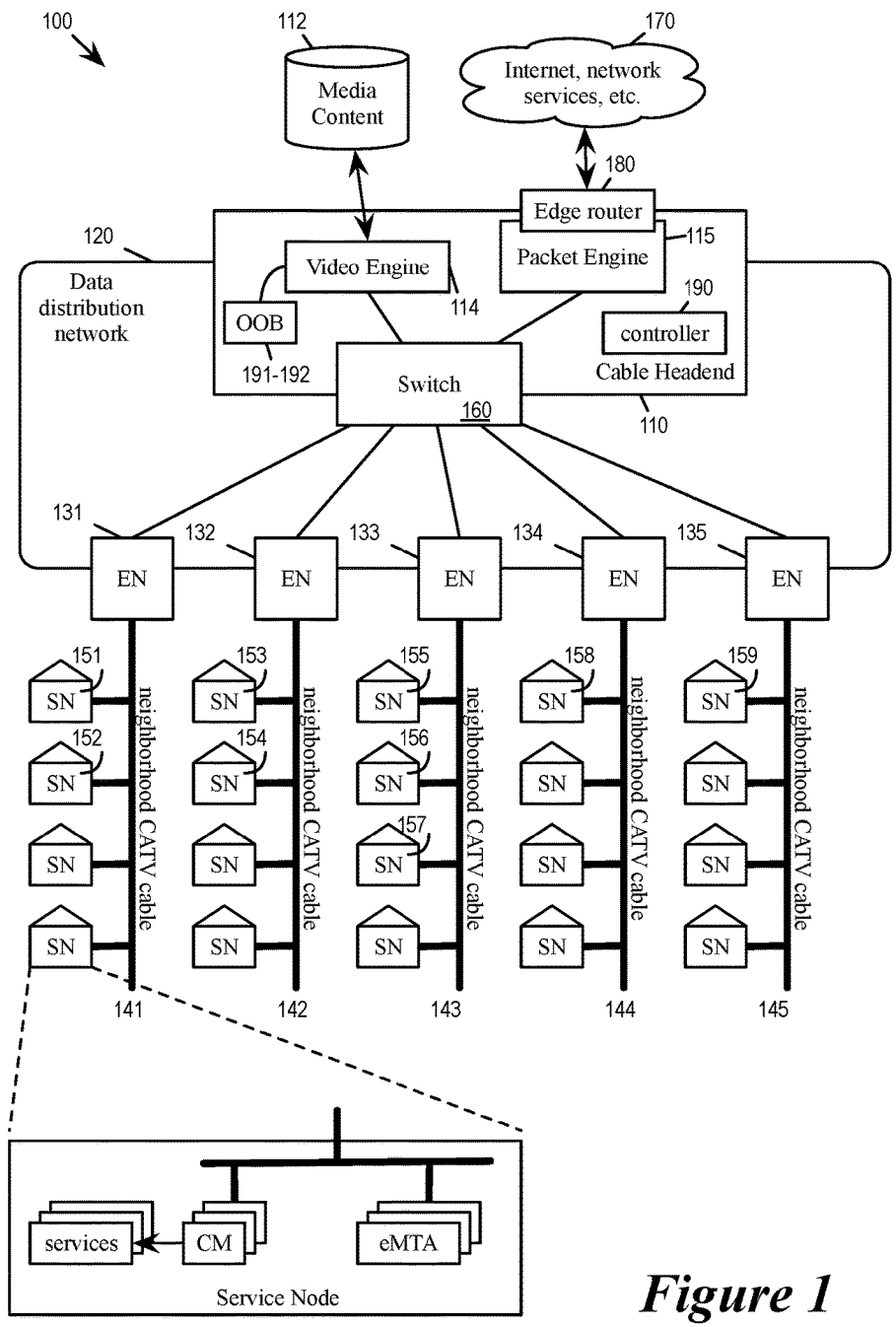
FIG. 1 illustrates a distributed CATV system.

FIG. 1 illustrates a distributed CATV system 100 according to some embodiments of the invention. The distributed CATV system 100 use a set of distribution nodes for receiving high speed digital data from the central headend of the CATV system and translating the received digital data into RF waveforms over neighbor CATV cables for delivery to user end cable modems. As illustrated, the CATV system 100 includes a central cable headend 110, which is communicatively coupled with distribution nodes 131-135 (also referred to as Ether nodes, or ENs) in the field over a data distribution network 120. The distribution nodes 131-135 are respectively connected to neighborhood CATV cables 141-145, which provide services to various service/subscriber nodes (SNs) such as SNs 151-159. The cable system 100 provides many different types of services (such as Internet access, analog television channels, digital television channels, on-demand channels, voice over IP, DOCSIS channels, etc.) to service nodes 151-159 at many different locations. The distributed architecture of this system is designed such that it can provide the service nodes with high-speed data for the desired services in a scalable, cost effect manner.

In some embodiments, the distributed CATV system 100 is a VCAP (Virtual Converged Cable Access Platform) system that uses remote distribution nodes (remote from the central office) to handle all of the RF communications with cable modems in a distributed fashion. This leaves the central cable head end to be an all-IP/all-Ethernet hub, and the packet engine of the cable system is in some embodiments located at the cable head end for handling the IP/Ethernet traffic. Such a cable system is therefore also referred to as a distributed cable management system (DCMS). In some embodiments, the remote distribution nodes distribute the functionality of a CMTS (Cable Modem Termination System) headend device out into the field as if the line cards of the CMTS are remotely located in the individual neighborhoods so that the CATV cables need not run all the way to the cable head end to receive the cable RF signals. Consequently, the remote distribution nodes are also referred to as Cable Modem Remote Termination System (CMRTS) devices in some embodiments.

The headend 110 includes a packet engine 115, a video engine 114, a controller 190, an edge router 180, and a packet switch 160. In some embodiments, the edge router 180, the packet engine 115, the video engine 114, and the switch 160 are located within one facility (i.e., the headend of the cable system), while the remote distribution nodes 131-135 and the subscriber nodes 151-159 are in remote locations (collectively referred to as the "field" in some embodiments).

The controller 190 in some embodiments handles the control and configuration of the cable system 100, particularly the devices and equipment at the cable head end. In some embodiments the controller 190 also controls the operation and configuration of remote distribution nodes 131-135. In some embodiments, the controller 190 is located at the head end 110 so it can control the equipment at the head end (e.g., a packet engine) directly. In some of these embodiments, the controller 190 remotely controls the distribution nodes through the data distribution network 120. In some embodiments, the controller is connected to the packet switch (e.g., 160) that connects to both the cable head end 110 and the remote distribution nodes 131-135. In some embodiments, the controller also serves as the source of the out-of-band data and transmits downstream out-of-band signals to the video engine 114 by using the out-of-band modulator 191 and receives out-of-band signals from the video engine 114 by using the out-of-band demodulator 192.

The video engine 114 receives media content 112 and distributes the received content to the subscribers 151-159 as subscribed cable services through data distribution network 120 and the distribution nodes 131-135. In some embodiments, the video engine also receives downstream out-ofband RF signals (e.g., TV guide information) from an out-of-band modulator 191 (OOB modulator) and transports them to the distribution nodes 131-135 as packets over the data distribution network 120. The video engine also receives upstream control packets from the distribution nodes and converts the received digital data as out-of-band RF signals for an out-of-band demodulator 192 (OOB demodulator). The OOB demodulator 192 is equivalent to a return-path demodulator at a legacy cable headend.

The packet engine 115 is responsible for routing packets to and from the distribution nodes 131-135 and the video engine 114 through the switch 160. The packet engine 115 has limited number of input ports, which may not be able to accommodate traffic for a far greater number of remote distribution nodes for which the packet engine is responsible. Hence, the switch (or the set of switches) 160 is inserted between the packet engine 115 and the remote distribution nodes 131-135. The edge router 180 connects the packet engine 115, and thereby the switches 160, the remote distribution nodes 131-135 and subscriber nodes 151-159, to the Internet 170. The edge routers handle north-south data packet traffic out of and into the DCMS 100.

The switch 160 is located in the cable head end 110 or in the data distribution network 120. In some embodiments, the switch 160 serves as point-to-point connections between the remote distribution nodes and the packet engine 115. As such, the remote distribution nodes 131-135 do not communicate with each other through the switch 160 directly, but rather through L2 and L3 switching/routing facilities provided by the packet engine 115. In some embodiments, the switch 160 includes a 10 G Ethernet switch that perform packet switching for the distribution network 120. In some embodiments, the switch 160 includes an optical splitter for distribution optical signals to the set of distribution nodes.

The distribution network 120 interconnects the headend 110 and the remote distribution nodes 131-135. The remote distribution network 120 is for distributing downstream data from the cable head end 110 to the remote distribution nodes 131-135 in the fields and for receiving upstream data from the remote distribution nodes 131-135 in the fields to the cable head end 110. In some embodiments, the distribution network built over a high capacity digital communications medium such optical fiber, which in some embodiments runs from the cable head end 110 to the remote distribution nodes 131-135. Such a distributed CATV network is therefore also referred as a Hybrid Fiber Cable (HFC) network. In some embodiments, the distribution network conducts high capacity packet traffic using protocols such as 10 Gigabit Ethernet to exchange digital packets between distribution nodes 131-135 and the various components of the headend 110. In some embodiments, the packet traffic (e.g., 10 G Ethernet) is conducted over the optical fiber.

Each of distribution nodes 131-135 in some embodiments converts data packets from the cable headend into a DOCSIS compliant RF signal that are to be processed by DOCSIS compliant cable modems at the service nodes. The distribution nodes are therefore also referred as Ether nodes (ENs) or Fiber nodes (FNs) as the packets are transmitted over optical fiber in some embodiments. In some embodiments, an EN strips the header information of the downstream IP packets it receives and delivers only the payload to the cable modem through the CATV cable. In other embodiments, an EN transmits the downstream IP packets in their entirety (header and payload) to the CATV cable. In some embodiments, the payloads of IP packets are digitized samples of RF waveforms, and the EN uses the digitized samples to reconstitute the RF waveform over the CATV cable. In some embodiments, the payloads of IP packets are QAM symbols, and the EN sends RF waveforms that are QAM modulated according to the received QAM symbols.

In some embodiments, each remote distribution node is associated with a MAC address, enabling a switch to direct to the EN the packets that are address to it and forward packets that are sent by the EN. This distributed architecture of system 100 is referred to as a remote MAC and PHY architecture because the in-the-field ENs that service multiple service nodes are MAC addressable, receive digital data packets, and perform the physical layer conversion to convert the digital data packets to RF signals in the field.

Each remote distribution node connects multiple subscriber nodes to the cable headend of the cable system 100. The subscriber nodes that are serviced by one remote distribution node are typically within one contiguous geographic region. In some embodiments, a service node represents a subscriber of cable services. Such a subscriber can be a household, an apartment, an office, etc. A service node is also therefore also referred to as a subscriber node in some embodiments. A service node includes one or more cable modems for receiving and transmitting cable signals on its neighborhood CATV cable. A cable modem at a service node in turn translates the received CATV RF signals into data for subscribing devices (e.g., set top box (STB), customer premise equipment (CPE), computers, handheld devices, multimedia terminal adapter (MTA), etc.) or for subscribed cable services (e.g., video on demand, voice over IP, etc.). In some embodiments, some of the subscribing devices have their own modems for directly receiving the subscribed services, such as an embedded MTA (eMTA).

I. Transporting Out-of-Band Signals

Cable systems are generally categorized into in-band and out-of-band (OOB) data types. The in-band type generally sends data in the vertical blanking interval of the television signal, by modulation of the horizontal sync interval, or via the audio subcarrier of the channel signal. Out-of-band systems utilize a separate carrier signal that is outside of the television frequency spectrum to send data. The data is usually by using modulation schemes such as frequency shift keying (FSK), phase shift keying (PSK), or QPSK/QAM. The advantage of an out-of-band system is that a cable system decoder unit may be addressed at any time, irrespective of the channel to which it is tuned. Cable set-top boxes (STBs) generally uses out-of-band channels to deliver supplemental information such as program guides, channel lineups, updated code images, or certain types of control data that are supplementary to the media content provided by the video engine. (An out-of-band channel is therefore also referred to as a supplementary channel in some embodiments).

Figure 2:
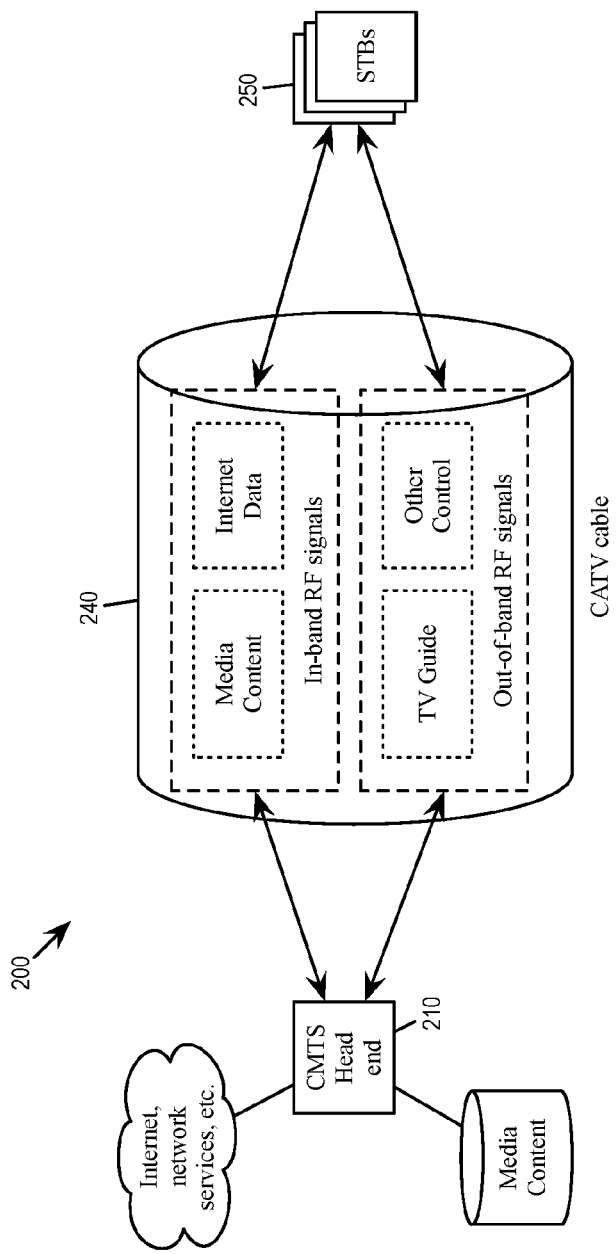
FIG. 2 illustrates a legacy or conventional CATV system in which the headend of the CATV system exchanges out-of-band data with STBs directly over CATV cables.

FIG. 2 illustrates a legacy or conventional CATV system 200 in which the headend of the CATV system exchanges out-of-band data with STBs directly over CATV cables. As illustrated, the legacy system 200 has a CMTS headend 210 that is in RF communication with subscriber nodes 250 over CATV cable 240. Most of the data or services being delivered from the cable headend 200 to the subscriber nodes 250 are conducted by using in-band RF signals over the CATV cable 240, data such as media content (e.g., video and audio of movies, TV, or other provider content) and Internet traffic. Certain types of data such as TV guide information as well as some control data are transmitted to subscriber STBs in subscriber nodes 250 as out-of-band signals.

As mentioned, the headend of a distributed CATV system does not directly drive RF signals in CATV cables. Instead, data from headend is delivered to distribution nodes as digital packets (e.g., 10 G Ethernet) over a digital communications medium, and the distribution node in turn convert the digital data in the packets into RF waveforms over the CATV cables. In some embodiments, the video engine at the headend of the distributed CATV system converts out-of-band RF signals into digital packets and delivers the digital packets to the distribution nodes over the digital communications medium. The distribution nodes in turn use the content of the received packets to reconstitute the out-of-band signals as RF waveforms over the neighborhood CATV cables.

In some embodiments, in order for the components of the distributed CATV system to work with legacy CATV equipment (such as set-top boxes, cable modems, or CMTS headend), the signal levels of RF interfaces of the distributed CATV system has to be calibrated in order to match with what is expected by legacy CATV equipment. Specifically, in some embodiments, the video engine 114 has a programmable gain for adjusting the power level of the upstream RF signal to the out-of-band demodulator 192, while each distribution node has a programmable gain for adjusting the power level of the downstream RF signal to its corresponding set of set-top boxes or cable modems over the CATV cables.

Figure 3:
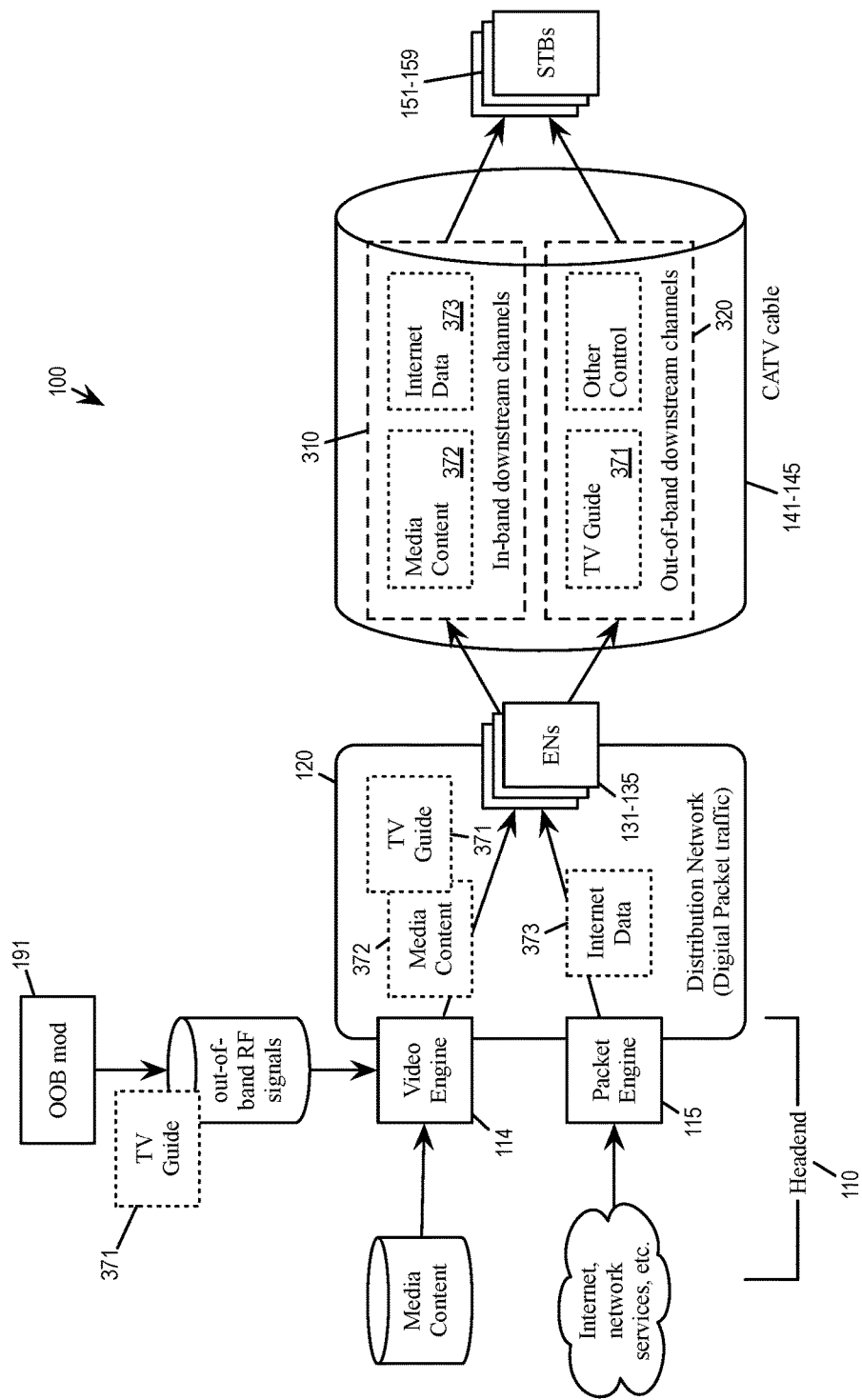
FIG. 3 illustrates a distributed CATV system transporting out-of-band control signals between the headend and a service node.

FIG. 3 illustrates the distributed CATV system 100 transporting out-of-band control signals between the headend 110 and a service node according to some embodiments of the invention. The video engine 114 of the CATV system 100 converts out-of-band RF signals into digital packets and delivers the digital packets to the distribution nodes 131-135 over the data distribution network 120, and the distribution nodes 131-135 use the content of the received packets to reconstitute the out-of-band signals as RF waveforms over neighborhood CATV cables 141-145 to the STBs in subscriber nodes 151-159.

The video engine 114 receives media content 112 along with OOB data 371 (illustrated as TV programming guide). The video engine 114 receives the OOB data from the OOB modulator 191 as RF waveforms in out-of-band frequencies, which is digitally modulated by QPSK modulation scheme. The video engine 114 samples, down-converts and decimates the OOB signal. Resulting RF samples are sent as Ethernet packets over the data distribution network 120.

The distribution nodes 131-135 receives packets containing the OOB data 371 over the distribution network 120, along with packets containing media content 372 from the video engine 114 and packets containing Internet data 373 from the packet engine 115. In some embodiments, the downstream packets containing OOB data to the set of distribution nodes are transmitted as multicast packets having a multicast address as destination address.

The distribution nodes 131-135 receives these packets and generates downstream RF waveforms according to the content of the received packets. The generated downstream RF waveforms are transmitted by in-band downstream channels 310 carrying media content 372 and Internet data. The generated downstream RF waveforms also include reconstituted RF waveforms transmitted out-of-band downstream channels 320 carrying the OOB data 371. These generated RF waveforms are transmitted over the neighborhood CATV cables 141-145 to reach the STBs 151-155. The reconstituted downstream out-of-band RF waveforms are transmitted over the same frequency band as at the input of the video engine 114.

Figure 4:
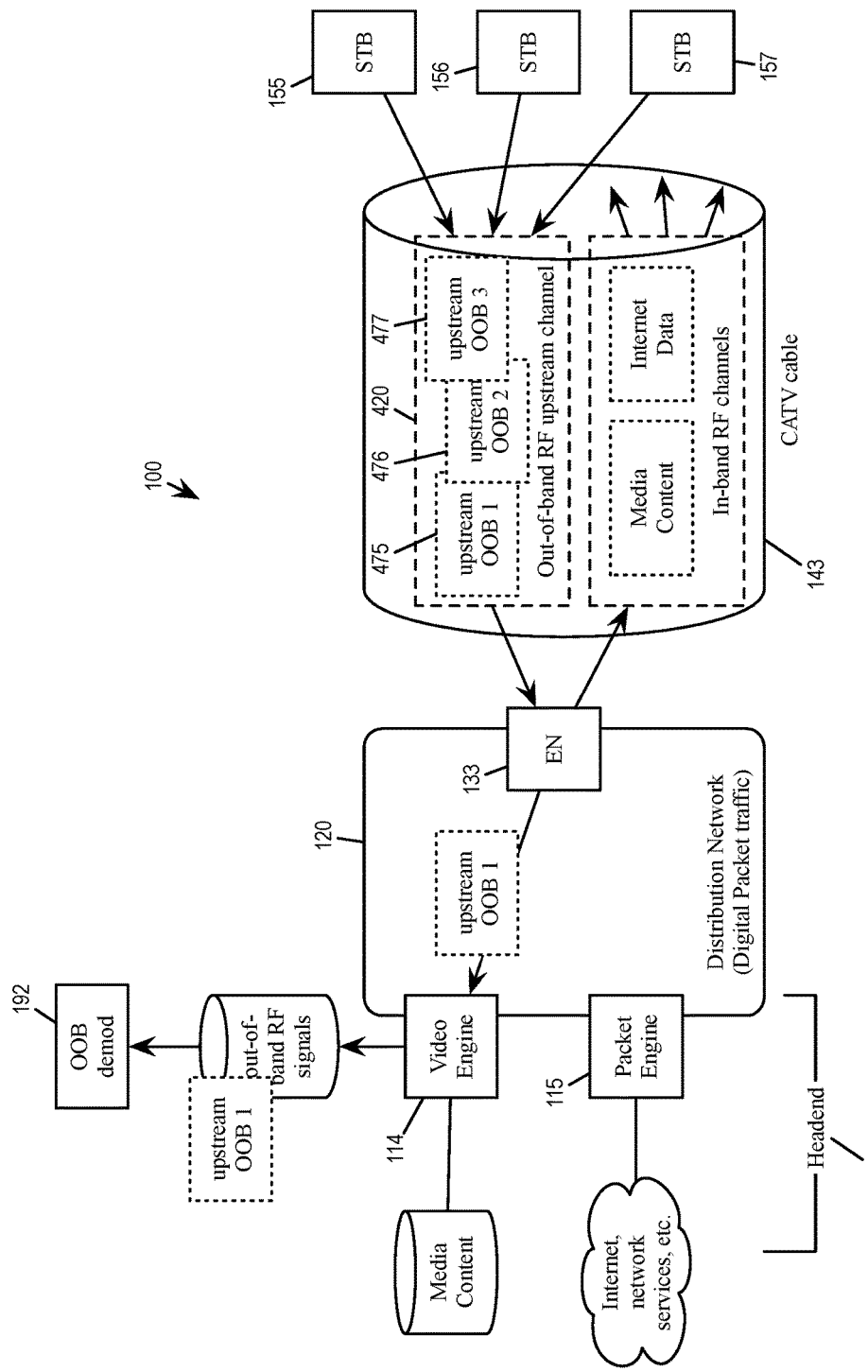
FIG. 4 illustrates the transport of out-of-band data upstream from STBs to the cable headend.

FIG. 3 illustrates the transport of out-of-band data in the downstream direction. FIG. 4 illustrates the transport of out-of-band data upstream from STBs to the cable headend. Specifically, the figure illustrates the transport of upstream OOB data from STBs in subscriber nodes 155-157, which are connected to the distribution node 133 through the neighborhood CATV cable 143.

As illustrated, the STBs in subscriber nodes 155-157 send data upstream as RF waveforms in an upstream out-of-band channel 420 over the CATV cable 143. Specifically the STB 155 is sending OOB data 475, the STB 156 is sending OOB data 476, and the STB 157 is sending OOB data 477. Since STBs 156-157 are all sending data over the same upstream out-of-band channel 420, they are allocated different time slots for transmission upstream in order to avoid collision.

The distribution node 133 in turn receives the RF waveforms in the upstream out-of-band channel 420 and convert the received RF waveforms into digital data by sampling, down-converting, and decimating the signal. The resulting samples are sent as IP packets to the video engine 114 over the distribution network. The video engine 114 receives the IP packets, extracts and interpolates the samples, and then communicates them to a DAC. The reconstituted RF waveform is transmitted over the same frequency band as at the input of the distribution node 133.

In some embodiments, the upstream out-of-band channel and the downstream out-of-band channel are over different frequency ranges. For example, in some embodiments, the downstream out-of-band transmission takes place over frequency range around 74 MHz, while the upstream out-of-band transmission takes place over a frequency range that is below 40 MHz.

In some embodiments, the video engine includes an ADC for sampling the downstream out-of-band signal at the headend. This sampling produces samples of the out-of-band waveform at a rate of the clock operating the ADC. However, this sampling rate at the ADC of the video engine is greater than what is needed for transporting the information in the out-of-band channel data. In order to use the bandwidth or data carrying capacity of the distribution network efficiently, some embodiments reduces the number of samples (decimation or down-sampling) to what is sufficient (or minimally required) for recording the information carried by the out-of-band channel. In some embodiments, sampling rate at the ADC is referred to as the ADC rate, and the reduced rate sufficient for carrying the out-of-band information is referred to as the baseband rate, which is the actual rate of the data being carried. The reduced sample data are then stored in a packet and transmitted downstream to the distribution nodes through the data distribution network. A distribution node upon receiving the downstream packet extracts the out-of-band data from the packet and reconstitutes the out-of-band downstream RF waveforms for transmission over a CATV cable by up-sampling the extracted out-of-band channel data from the lower baseband rate. In some embodiments, the up-sampled data rate matches ADC sampling rate at the video engine.

Figure 5:
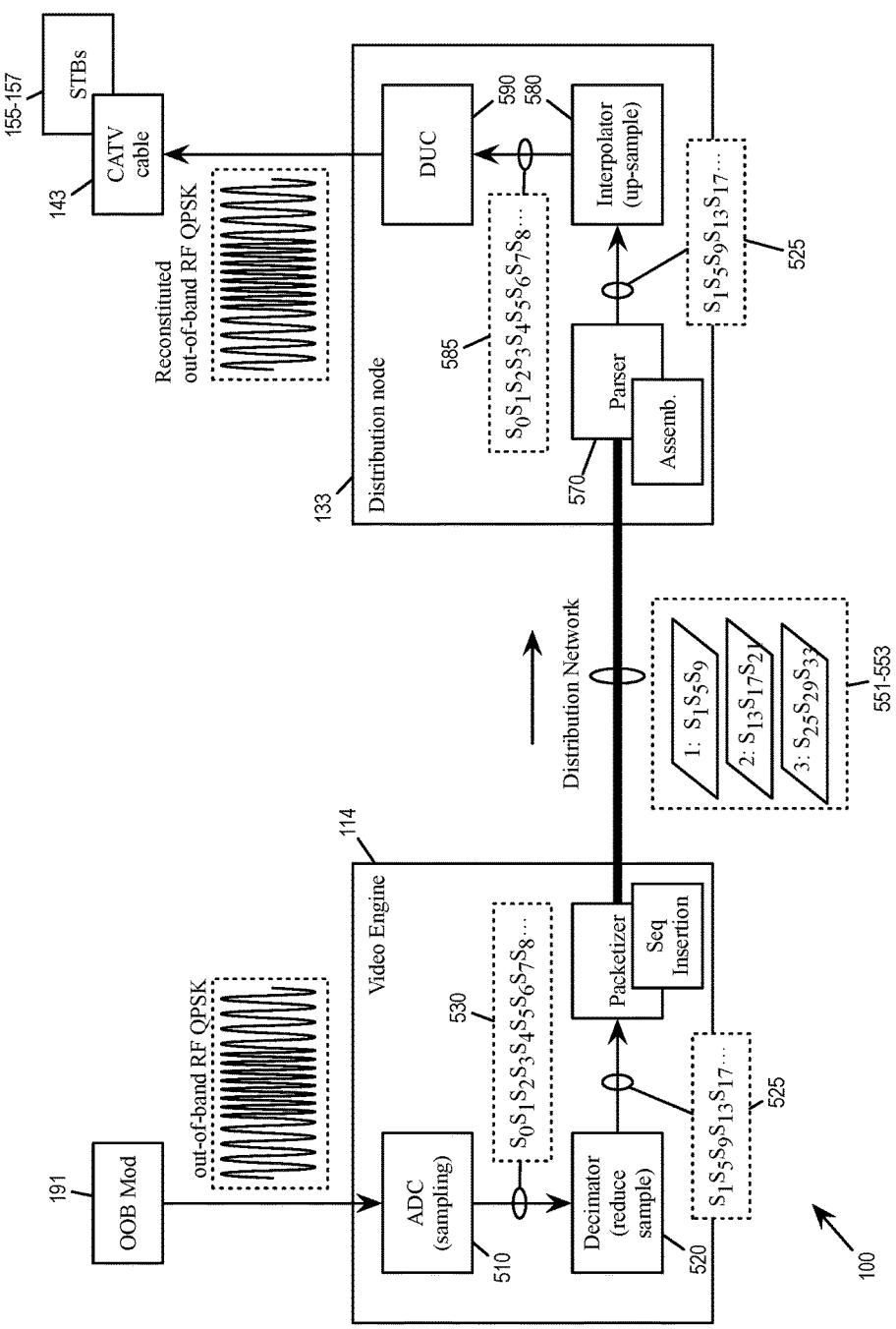
FIG. 5 illustrates the transport of downstream out-of-band data through digital data distribution network.

FIG. 5 illustrates the transport of downstream out-of-band data through digital data distribution network. Specifically, the figure shows the sampling and down-sampling of downstream out-of-band signals at the video engine 114 as well as the up-sampling and reconstruction of the downstream out-of-band RF waveform by one of the distribution nodes (the distribution node 133 in this example).

As illustrated, the video engine 114 receives QPSK modulated RF waveforms in out-of-band frequencies. The video engine has an ADC 510 (analog to digital converter) that samples the RF waveform. A decimator (or a series of decimators) 520 reduces the number of samples according to a baseband rate, since the sampling rate at the ADC 510 is far greater than the actual data rate of the out-of-band signals. The decimator 520 produces reduced samples 525, which are stored into packets 550 to be transmitted by a packetizer (or packet composer) 530.

The distribution node 133 receives the packets 551-553 from the video engine 114. The distribution node 133 has a parser 570 that parses the received packets 551-553 to extract the reduced sample 525. The distribution node 133 employs an interpolator (or a series of interpolators) 580 to interpolate the reduced samples 525 in order to approximate the samples that were dropped by the video engine 114. This creates the interpolated samples 585 that have enough samples to drive a digital to analog converter (DAC) 590 to produce a reconstituted out-of-band RF waveform over the CATV cable 143. In some embodiments, the digital to analog converter is a digital up converter (DUC) that up-converts the interpolated samples 585 to a specified pass band frequency (e.g., 74 MHz). This allows the STBs 155-157 to receive the downstream out-of-band RF waveforms as if directly from the headend 110 of the CATV system. The DAC 590 is equipped with adjustable gain capacity. This is so the RF output of distribution node to the CATV cable would match or would be similar to those produced by legacy CMTS when driving the CATV cable. In some other embodiments, the distribution node 133 does not have the interpolator 580. Rather, the samples are fed directly from the assembly/parser 570 to the DUC 590, which performs interpolation/up-conversion.

In some embodiments, the packets containing the samples of OOB signals are sequentially numbered to indicate their ordering so the OOB signals can be reconstructed from the packetized samples based on the correct ordering. The video engine 114 when creating the packets for downstream transmission, inserts order number into the header of the packets (e.g., header under Real-Time Transport Protocol or RTP). Once the packets reached a distribution node (e.g., 133), the distribution node uses the order number in the packet headers to assemble samples in the correct ordering in order for the interpolator 580 and the DAC 590 to generate the correct out-of-band RF waveform.

In some embodiments, the interpolator(s) of the distribution node is configured to exactly undo the effect of the decimator(s). In some embodiments, the decimator in the video engine includes a number of stages, and the distribution node would have the same number stages of corresponding interpolator stages to match and undo the operations performed by the decimator.

Figure 6:
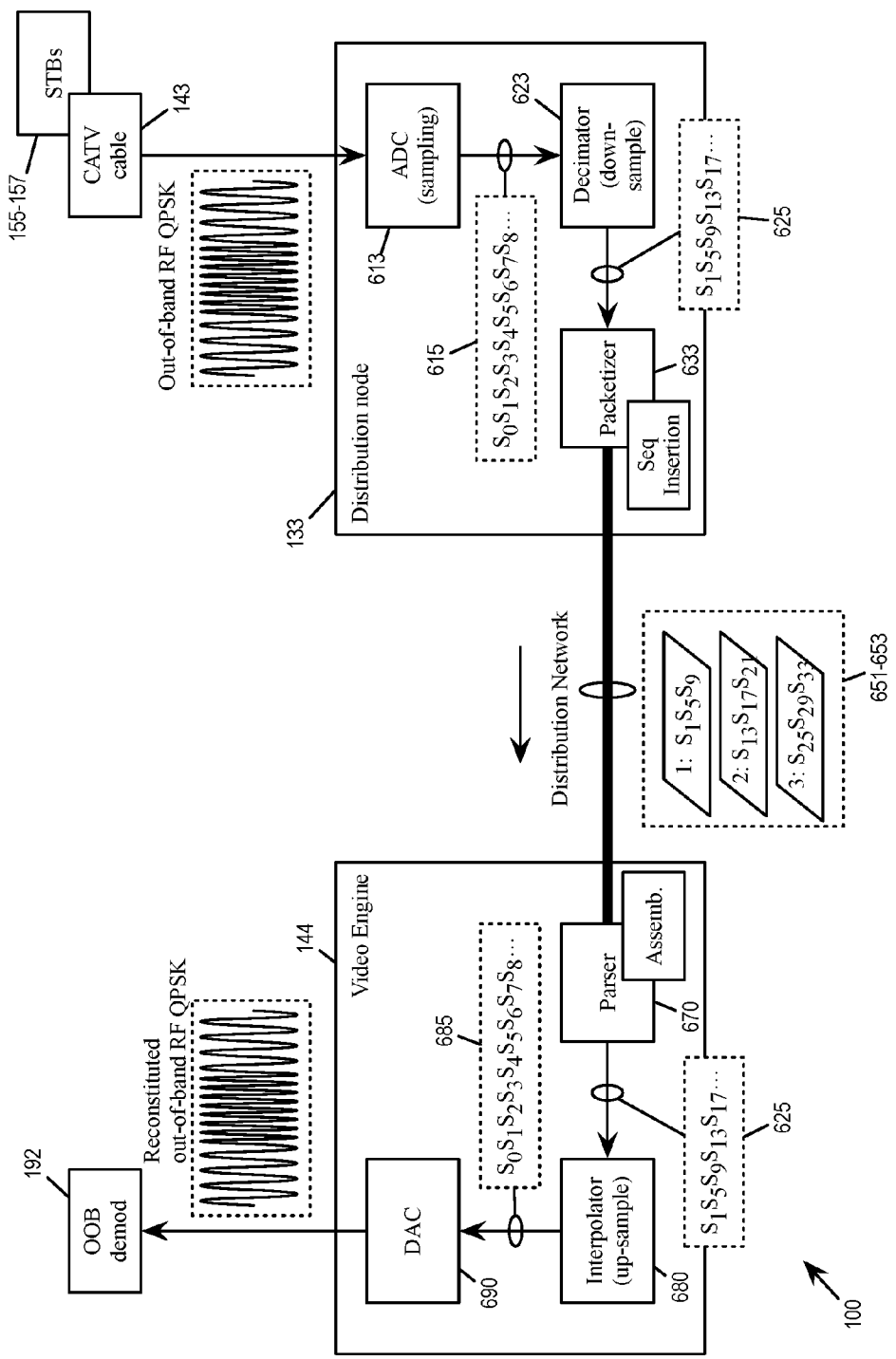
FIG. 6 illustrates the transport of upstream out-of-band data through digital data distribution network.

FIG. 6 illustrates the transport of upstream out-of-band data through digital data distribution network. Specifically, the figure shows the sampling and down-sampling of upstream out-of-band signals at the distribution node 133 as well as the up-sampling and reconstruction of the upstream out-of-band RF waveform by the video engine 114.

The distribution node 133 receives QPSK modulated RF waveforms in out-of-band frequencies from the STBs 155-157. The distribution node 133 has an ADC 613 that samples the RF waveform. A decimator (or a series of decimators) 623 reduces the number of samples as the sampling rate at the ADC 613 is far greater than the actual data rate of the out-of-band signals. The decimator 623 produces reduced samples 625, which are stored into packets 651-653 by a packetizer (or packet composer) 633.

The distribution node 133 transmits the packets 651-653 to the video engine 114, which has a parser 670 that parses the received packets 651-653 to extract the reduced sample 625. The video engine 114 employs an interpolator (or a series of interpolators) 680 to interpolate the reduced samples 625 in order to approximate the samples that were dropped by the distribution nodes (including 133). This creates the interpolated samples 685 that have enough samples to drive a digital to analog converter (DAC) 690 to produce a reconstituted out-of-band RF waveform for the OOB demodulator 192 at upstream out-of-band frequencies (e.g., less than 40 MHz). This allows the STBs 155-157 to transmit upstream out-of-band RF waveforms to the headend 110 as if the STBs are directly connected to the CMTS of the CATV system via CATV cables.

In some embodiments, the upstream datapath of a distribution node detects whether there is a valid upstream out-of-band data coming from CATV cable. The distribution node would generate and produce packet to the cable headend/video engine only if there is a valid packet to be sent. This conserves power at the distribution node as well as bandwidth at the distribution network. In some embodiments, the distribution node calculates power in high-resolution frequency bins in order to detect a start of a packet. The distribution node would transmit an upstream packet containing the baseband samples to the video engine only when a start of packet is detected, otherwise the distribution node would mute its transmitter to the distributed network (10 G/Fiber).

Figure 7:
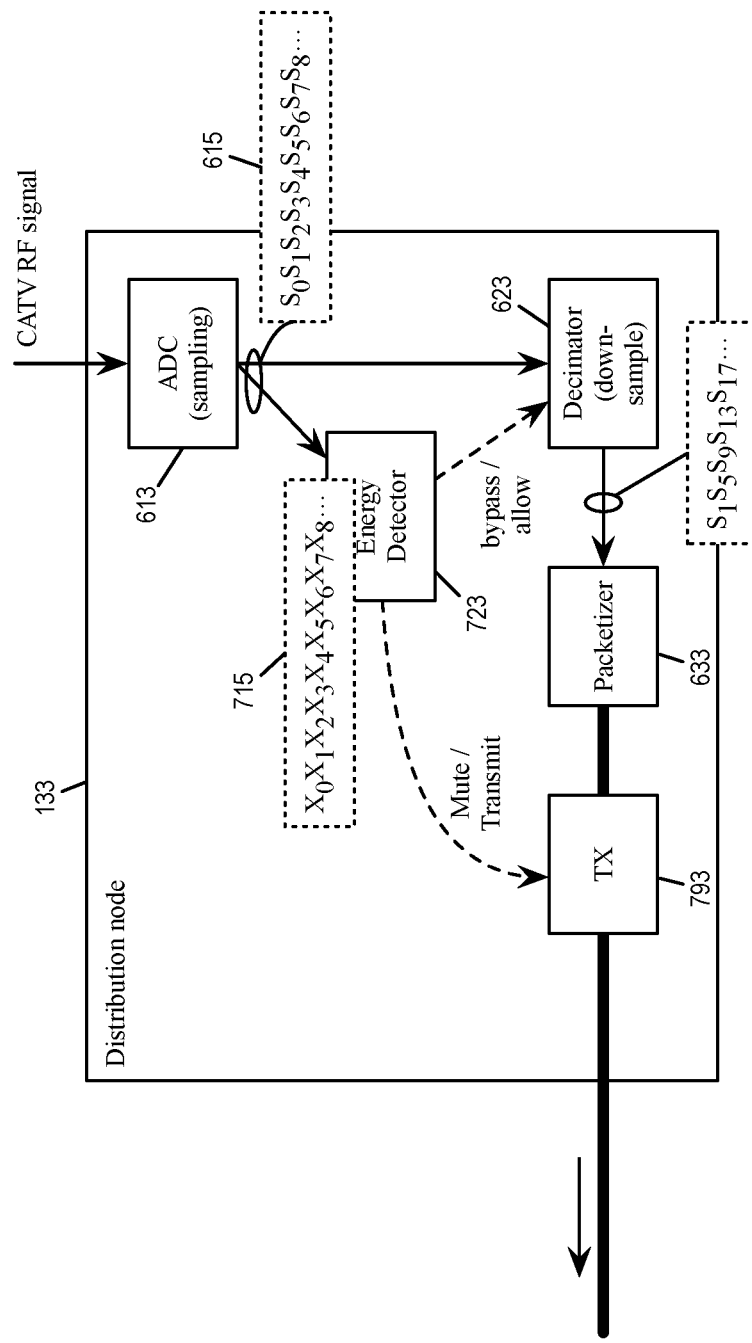
FIG. 7 illustrates a distribution node that detects valid upstream out-of-band data from demodulated symbols.

FIG. 7 illustrates a distribution node that detects valid upstream out-of-band data from a series of samples. Specifically, the figure shows the distribution node 133 calculating power in order to determine whether to transmit the packet or to mute the transmitter.

As illustrated, the ADC 613 of the distribution node 133 continuously samples the RF waveforms on the CATV cable and provides digital samplings of the RF signal. The samples are fed to the decimator 623 to down-sample as well as to an energy detector 723. The energy detector 723 calculates power of the incoming samples and compares it against a programmed threshold. In some embodiments, the successful detection of energy indicates that a start of packet was detected.

As illustrated, the distribution node has a transmitter 793 interfacing the distribution network 120 for driving digital signals onto the distribution network. The energy detector 723 provides an indication of start of packet. This indication allows the transmission of the samples as a packet (after being down-sampled by the decimator 623 and composed into packet by the packetizer 633) if valid out-of-band data was detected. In some embodiments, this indication disables or enables the transmitter 793 of the distribution node 133. In some embodiments, this indication cause the samples 615 of the ADC 613 to be bit-bucketed or discarded, thereby bypassing subsequent datapath components (the decimator 623, the packetizer 633, and the transmitter 793) and result in no transmission.

II. Synchronization of Upstream Signals

In a CATV system, all STBs connected to a same distribution node share the same set of CATV cables as communication medium for upstream traffic towards the headend. In order for the upstream traffic from the different STBs to not collide with each other on the same set of CATV cables, the CATV system assigns each STB its own upstream transmission time slot. In some embodiments in which upstream out-of-band signals are carried across the packet distribution network as packets only to be reconstituted as out-of-band RF waveforms at the video engine of the headend, the initial delay as seen by the STBs during ranging process is to be kept constant despite of the distribution network jitter.

In order to ensure that end-to-end delay from the headend to each STB remain constant, some embodiments synchronizes the clocks of the different devices in the distributed CATV system. In some embodiments, the video engine, the distribution nodes, and the STBs operate off different clocks, wherein one of the devices in the cable system serve as the master device for maintaining a master clock and for sending clock synchronization information that allow slave devices to synchronize their local clocks with the master clock. In some embodiments, the clock synchronization information are delivered by highest priority packets in the cable system and using protocols such as Precision Time Protocol (PTP). In some embodiments, the STBs do not participate in PTP protocol as slave devices.

Upstream signals from different STBs take different paths to arrive at the headend as the STBs, the distribution nodes, and the headend are separated from each other by varying distances or hops. Consequently, upstream signals from different STBs off the same neighborhood CATV cable can take different amount of time to reach the corresponding distribution node, and packets from different distribution nodes can take different amount time to reach the headend. This causes the upstream data from the different STBs to take different amount of time/delay/latency to arrive at the headend/video engine.

In some embodiments, though different STBs have different delays to the EN because signals from different STBs have to travel through different lengths of CATV cable, for each STB, the time it takes to propagate a signal from the STB to the EN is constant. However, the transmission delay of packets between an EN and the headend/video engine is not constant, because multiple different ENs sending IP packets upstream to the same video engine across the distribution network requires link aggregation which can result in packet jitter.

In some embodiments, the video engine has a delay equalization buffer (or jitter buffer) that can be configured to insert the requisite delay offset in order to remove the jitter of upstream IP packets. In some embodiments, the delay equalization buffer of the video engine equalizes the delays of upstream packets over the distribution network from each of the distribution nodes. In some embodiments, the jitter buffer temporarily stores each upstream packet until a scheduled time that is computed to equalize the delays among the different distribution nodes. In some embodiments, each packet is associated with a timestamp, and the scheduled time to remove the packet from buffer (for transmission) is computed based on the packet's timestamp and the equalized delay. In some embodiments, the distribution node that sends the packet upstream to the headened/video engine also inserts the timestamp into the packet.

Figure 8:
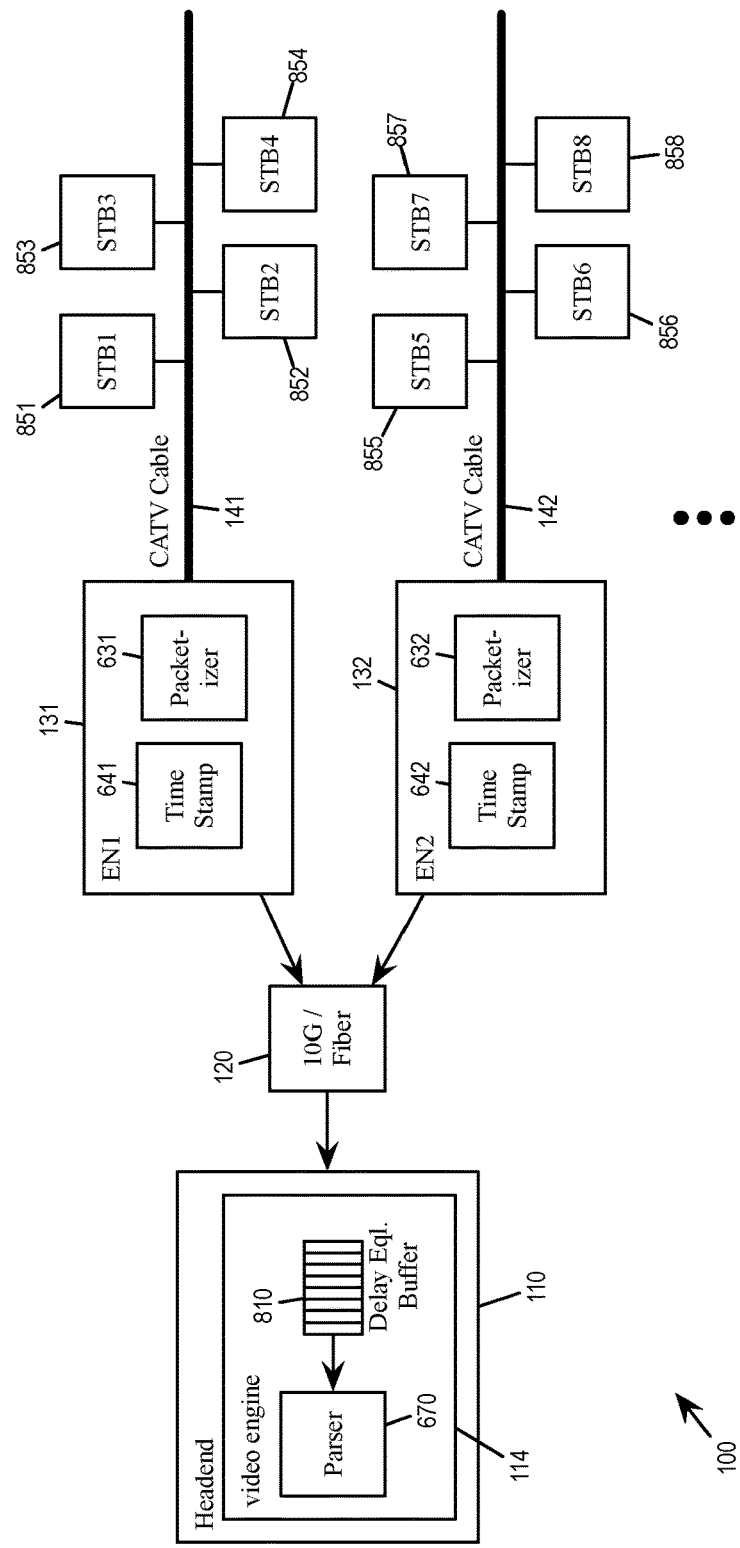
FIG. 8 illustrates the distributed CATV system 100 in which the video engine 114 and the distribution nodes 131-139 each has a delay equalization buffer for equalizing delays of signals or packets from different sources.

FIG. 8 illustrates the distributed CATV system 100 in which the video engine 114 has a delay equalization buffer for equalizing delays of signals or packets in order to remove jitter across the distribution network.

As illustrated, the headend 110 of the CATV system has a delay equalization buffer 810 for delaying upstream packets from the distribution network. In some embodiments, the delay equalization buffer 810 is tightly coupled to the video engine 114 or is part of the video engine 114 for equalizing delay of upstream out-of-band data packets. As illustrated, the output of the delay equalization buffer 810 stores upstream packets that comes from distribution nodes 131-139 via the distribution network 120. Each packet is stored for a period of time before the stored packet is retrieved for transmission to the OOB demodulator 192 (not illustrated) through the packet parser 670.

Each of the distribution nodes (ENs) 131-139 receives upstream OOB RF waveforms from different STBs and packetize them for upstream transmission to the video engine 114 across the distribution network. Each distribution node also inserts time stamp into each generated upstream packet. For example, the distribution node 131 inserts timestamp (at a timestamp insertion module 641) into upstream packets created by the packetizer/packet composer 631 based on OOB signals received from STBs 851-854 (STB1-STB4) via the CATV cable 141, while the distribution node 132 inserts timestamp (at a time stamp insertion module 642) into upstream packets created by the packetizer/packet composer 632 based on OOB signals received from STBs 855-858 (STB5-STB8) via the CATV cable 142.

Figure 9:
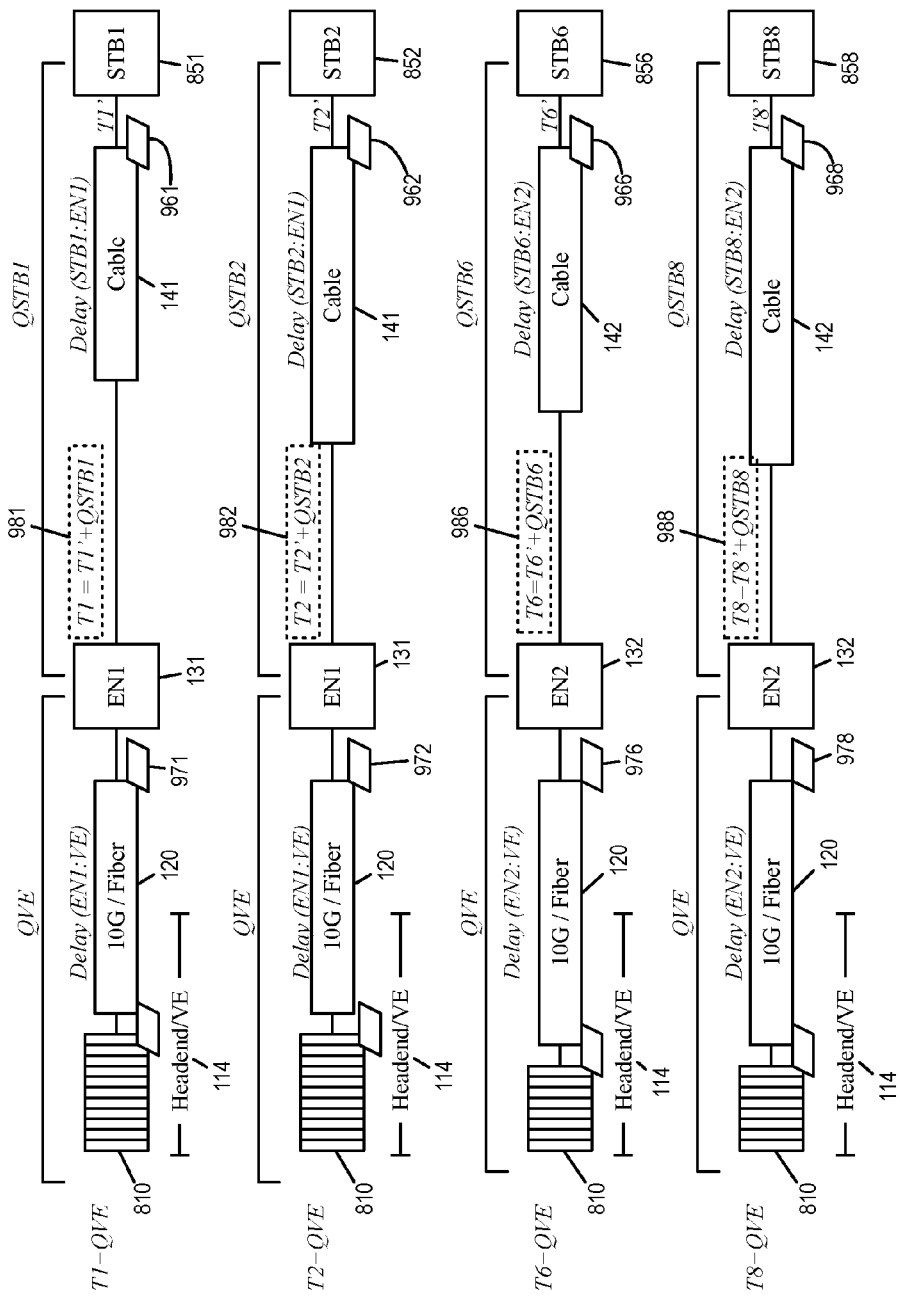
FIG. 9 conceptually illustrates the equalization of delays from different distribution nodes at the headened/video engine for upstream OOB data packets.

FIG. 9 conceptually illustrates the equalization of delays from different distribution nodes at the headened 110/video engine 114 for upstream OOB data packets.

As illustrated, data from different STBs 851, 852, 856 and 858 take different amount time/delay to propagate through CATV cables and reach their distribution nodes (EN1 131 or EN2 132). These different delays are illustrated as QSTB1=Delay(STB1:EN1), QSTB2=Delay(STB2:EN1), QSTB3=Delay(STB6:EN2), and QSTB4=Delay(STB 8:EN2). However, these delays are constant and would not contribute to jitter.

In the illustrated example, the STB1 has transmitted upstream data 961 at time T1', STB2 has transmitted upstream data 962 at time T2', the STB6 has transmitted upstream data 966 at time T6', and STB8 has transmitted upstream data 968 at time T8'. The upstream data 961 arrives at distribution node 131 at time T1=T1'+QSTB1, the upstream data 962 arrives at distribution node 131 at time T2=T2'+QSTB2, the upstream data 966 arrives at distribution node 132 at time T6=T6'+QSTB6, the upstream data 968 arrives at distribution node 132 at time T8=T8'+QSTB8. The distribution node 131 in turn generates packet 971 with timestamp 981 (T1), packet 972 with timestamp 982 (T2) and the distribution node 132 in turn generates packet 976 with timestamp 986 (T6) and packet 978 with timestamp 988 (T8).

In some embodiments, the system computes an equalized delay for all packets from all distribution nodes to the headend/video engine. This equalized delay is used to determine, along with timestamps associated with these packets, when to retrieve each of the packets for transmission to the OOB demodulator 192. (This equalized delay to the video engine is illustrated as QVE in the figure).

As illustrated, the distribution node 131 (EN1) transmits the packets 971 with timestamps 981 (T1) and the packet 972 with timestamp 982 (T2). They traverse the distribution network 120 to reach the headend/video engine after some delay (Delay(EN1:VE)) that is subject to jitter. The packets are then stored in the delay equalization buffer 810 at the headend 110. The video engine 114 retrieves the packet 971 at time T1+QVE and the packet 972 at time T2+QVE.

The distribution node 132 (EN2) transmits the packets 976 with timestamps 986 (T6) and the packet 978 with timestamp 988 (T8). They traverse the distribution network 120 to reach the headend/video engine after some delay (Delay(EN1:VE)) that is subject to jitter. The packets are then stored in the delay equalization buffer 810 at the headend 110. The video engine 114 retrieves the packet 976 at time T6+QVE and the packet 978 at time T8+QVE.

In some embodiments, the same equalization delay is applicable to all ENs communicatively coupled with the headend of the CATV system. In the example of FIG. 9, the same value QVE is applicable to EN1 and EN2 (and other distribution nodes not illustrated). By retrieving the packet 971 at T1+QVE and the packet 972 at T2+QVE from the delay equalization buffer 810 for transmission from the video engine 114, the equalization buffer 810 is effectively used to insert the requisite delay offsets for packets from both EN1 and EN2 (and from other distribution nodes) in order to equalize the delay among these different distribution nodes.

In some embodiments, the delay equalization buffer at the headend/video engine has a storage for storing packets from different sources and a scheduler for determining when to retrieve a packet for transmission. The scheduler uses a clock that is synchronized with the distribution nodes in the CATV system (e.g., through PTP protocol) so the retrieval of packets for transmission by different distribution nodes/video engine can be precisely timed to equalize delay or remove jitter.

Figure 10:
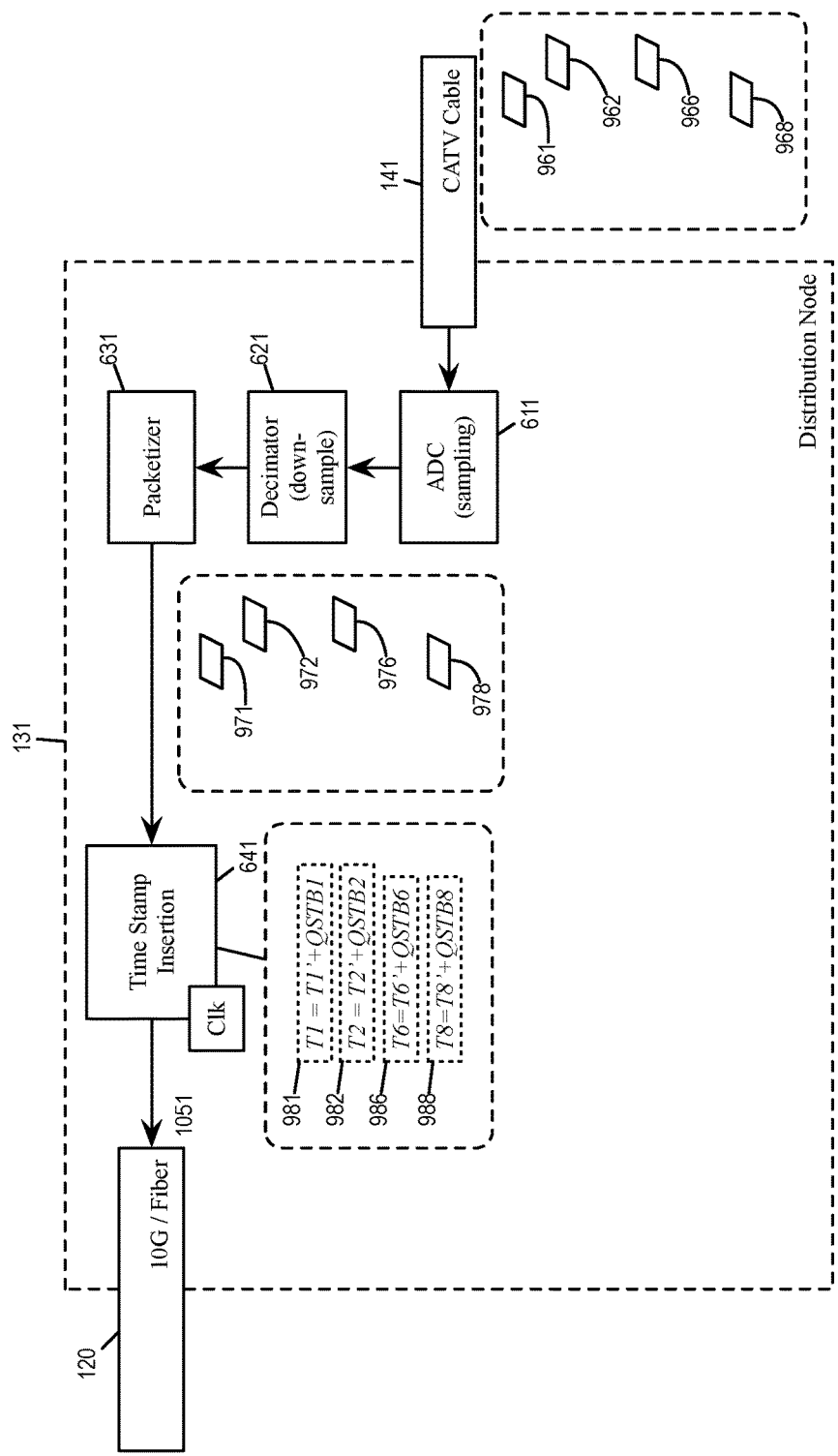
FIG. 10 illustrates the insertion of time stamps at a distribution node.

FIG. 10 illustrates the insertion of time stamps at a distribution node. As illustrated, the distribution node 131 has an ADC sampling module 611, a decimator 621, the packetizer 631 and the time stamp insertion module 641. When the distribution nodes 131 receives out-of-band RF signals (e.g., upstream data 961, 962, 966, and 968) from the CATV cable 141, the ADC 611 samples the RF signals, the decimator 621 down samples the data, and the packetizer 631 composes the packets (971, 972, 976, and 978) based on the reduced sample data. The timestamp insertion module 641 then inserts the timestamp into the composed packet (timestamps 981, 982, 986, and 988 into the packets 971, 972, 976, and 978, respectively). In some embodiments, the timestamp insertion module 641 keeps a clock that is synchronized with a clock at the video engine 114 by PTP protocol.

Figure 11:
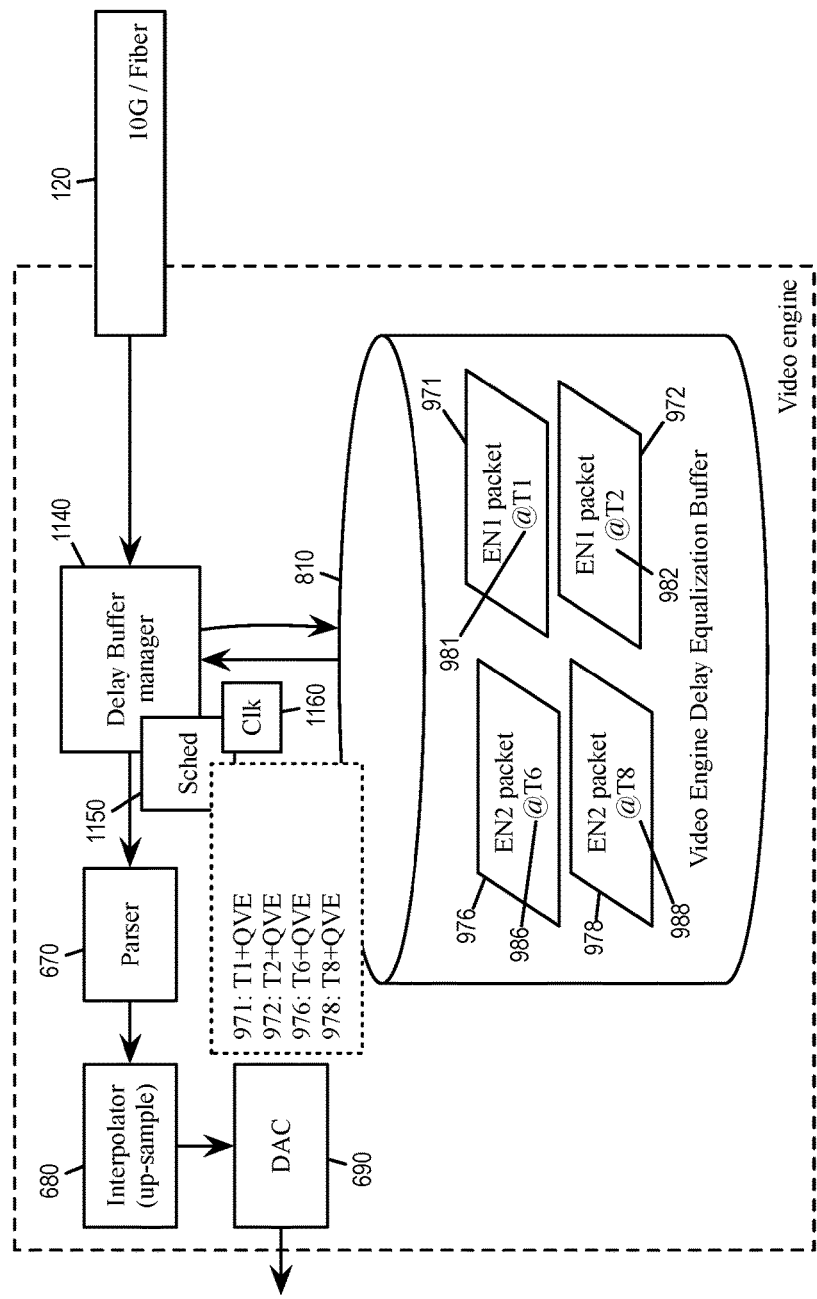
FIG. 11 illustrates the delay equalization buffer of the video engine.

FIG. 11 illustrates the delay equalization buffer of the video engine for some embodiments. As illustrated, the video engine 114 has the delay equalization buffer 810, which is managed by a buffer manager 1140. When the video engine 114 receives packets containing out-of-band data from the distribution network 120, the buffer manager 1140 stores the received packets into the storage of the delay equalization buffer 810. As each packet is being stored, the buffer manager schedules their retrieval and transmission to the RF output of the video engine 114 based on the timestamp of the packet and the predetermined equalized delay between the headend/video engine and the distribution nodes (i.e., QVE).

In the example illustrated in FIG. 11, the delay buffer manager has received and stored packets 971, 972, 976, and 978, which respectively have timestamps T1, T2, T6, and T8. The delay buffer manager 1140 has a scheduler 1150, which schedules the retrieval and transmission of each stored packet by adding the predetermined equalized delay to the timestamp of each stored packet, i.e., T1+QVE, T2+QVE, T6+QVE, and T8+QVE, respectively. The scheduler 1150 has access to a clock 1160, which is kept in sync with the distribution nodes by PTP protocol. The scheduler 1150 would know to retrieve the packet 976 for transmission when the clock 1160 reaches T6+QVE, the packet 972 when the clock reaches T2+QVE, etc. The retrieved packet are the sent to the packet parser 670, the interpolator 680, and the DAC 690 to have the data contained within the packets extracted, up-sampled, and transmitted via the RF output of the video engine 114.

In some embodiments, when the video engine 114 receives multiple upstream packets from multiple different distribution nodes that are scheduled to be transmitted to the headend at the same time, the video engine would transmits the content of one of the upstream packets to the headend. This is in contrast to legacy CATV system, where when two or more upstream packets arrive at the headend CMTS at the same time, those upstream packets collide and the signal is lost.

A delay equalization buffer can overflow or underflow. The equalization overflows when it has too many packets and no room for a newly received packet. The equalization underflows when say, the video engine is reading from its delay equalization buffer when no packet is available to be read. In some embodiments, the delay equalization buffer outputs null packet when it underflows and resets when it overflows. In some embodiments, the size of the delay equalization buffer is chosen to be large enough to minimize overflow condition (e.g., by choosing a QVE that is sufficiently large).

Figure 12:
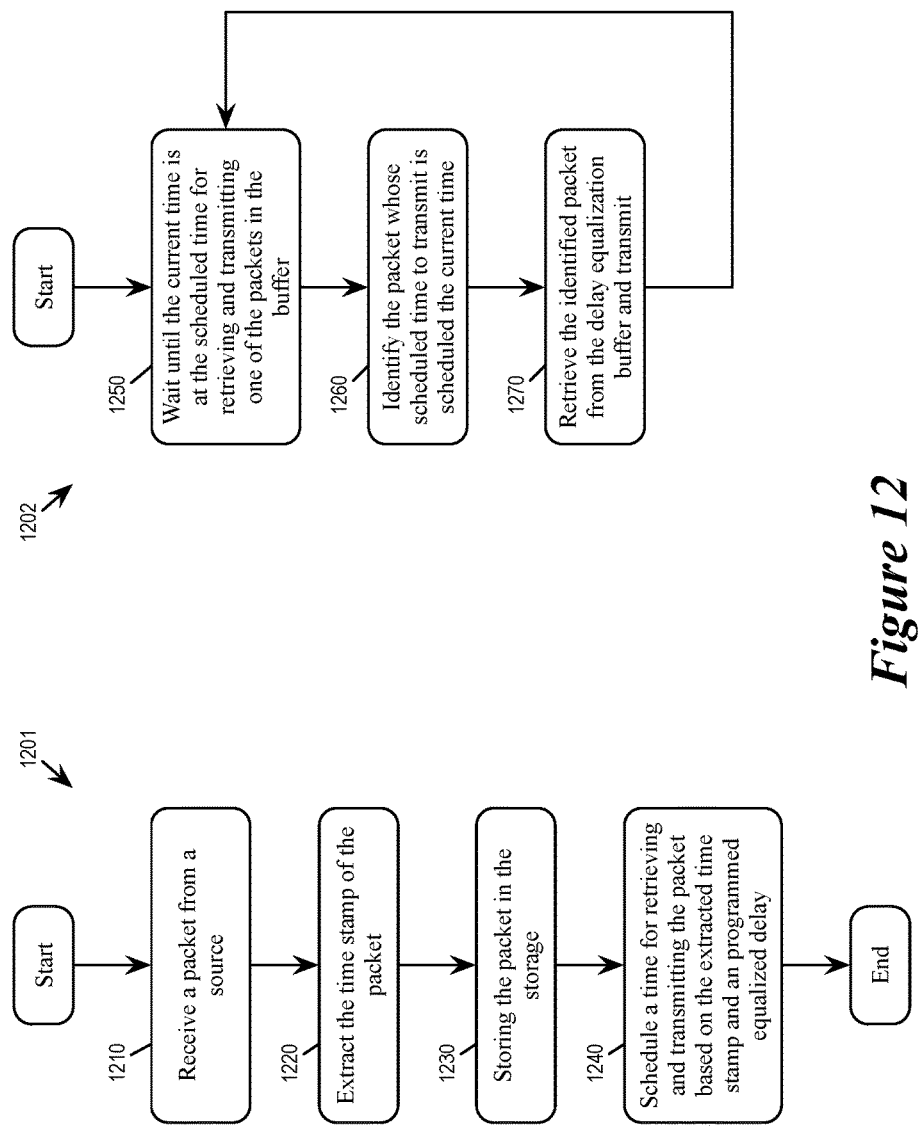
FIG. 12 conceptually illustrates processes for the using a delay equalization buffer to insert the requisite delay for equalizing the delays for out-of-band data coming from different STBs through different distribution nodes.

FIG. 12 conceptually illustrates two processes 1201 and 1202 for the using a delay equalization buffer to insert the requisite delay for equalizing the delay/remove jitter for out-of-band data coming from different distribution nodes. In some embodiments, the processes 1201 and 1202 are processes performed by buffer managers of equalization buffers inside the video engines (e.g., the buffer manager 1140 of the video engine 114). The process 1201 is for receiving and storing packets that come from different ENs subject to jitter, while the process 1202 is for retrieving packets from the delay equalization buffer for the OOB demodulator 192.

The process 1201 starts when the buffer manager receives (at 1210) a packet from a particular source. For a video engine, this packet is a packet that is received from the distribution network (10 G/Fiber). The process then extracts (at 1220) a time stamp from the packet. In some embodiments, this timestamp is a snapshot of a clock that is synchronized with other devices in the CATV system via PTP protocol. In some embodiments, this timestamp indicates the time when the distribution node has finished composing the packet.

Next, the process stores (at 1230) the packet in the storage of the delay equalization buffer. The process also schedules (at 1240) a time for retrieving the packet for transmission based on the extracted timestamp and a programmed equalized delay. For the video engine/headend, some embodiment program in the equalized delay between distribution nodes and the headend (i.e., QVE). The process 1201 the ends. The process 1202 would use this scheduled time to determine when to retrieve the packet for transmission.

The process 1202 starts by waiting (at 1250) until the current time is at the scheduled time for retrieving and transmitting one of the packets stored in the buffer. In some embodiments, the current time is the time that is synchronized with other devices in the CATV system, while the scheduled time is recorded by the process 1201 when the packet was received and stored into the buffer. The process then identifies (1260) the packet whose scheduled time to retrieve and transmit is the current time. The process then retrieves (at 1270) the identified packet from the storage of the delay equalization buffer and transmits the packet. The process then returns to 1250 to wait until the next scheduled time.

As mentioned, in some embodiments, the delay of out-of-band upstream signals (or any upstream signal) from an EN to the headend across the distribution network is not guaranteed to remain constant. For example, packets from a particular distribution node may take different paths/hops to reach the headend (e.g., due to load balancing), or may have to wait in various queues in the network for unspecified amount of time due to dynamic traffic congestion conditions (e.g., through the switch 160). This variance is referred to as network jitter, which may cause upstream out-of-band signals from a particular STB to arrive at the output of the video engine earlier or later than expected and thus miss the assigned time slot. The effects of such network jitters are removed by the use of the delay equalization buffer as described above. Consequently, the delay equalization buffer is also referred to as jitter buffer in some embodiments.

In some embodiments, the video engine stores upstream packets received from the distribution nodes into its jitter buffer and remove it for transmission at the scheduled time (based on the equalized delay QVE and the timestamp of the packet). This allows the video engine to remove the jitters between itself and the distribution nodes over the distribution network.

Figure 13:
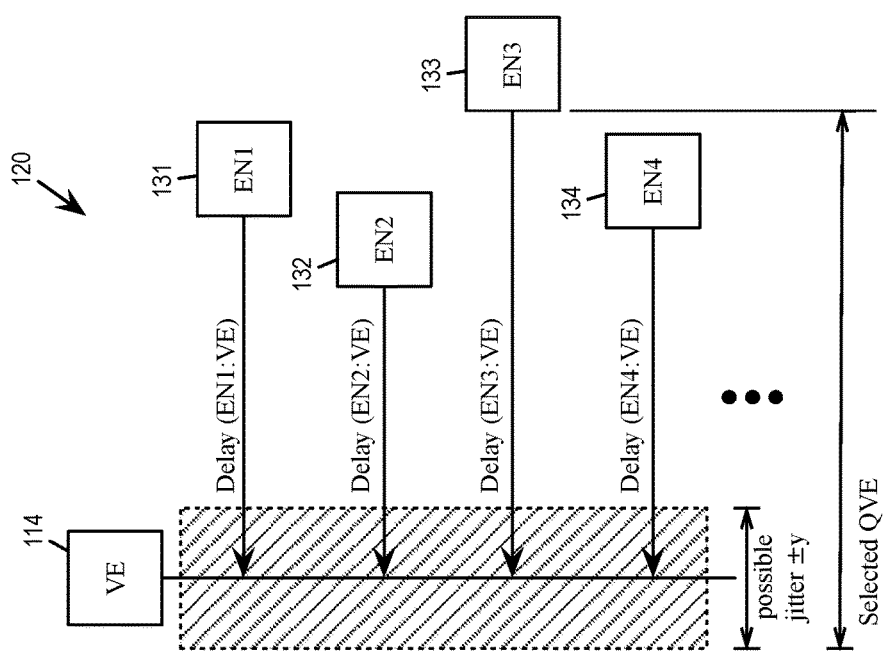
FIG. 13 illustrates an example of setting equalized delay based on jitter and largest measured delay for the video engine.

In order to be able to fully absorb the effect of network jitter, some embodiments use an equalized delay value (i.e., QVE) that is large enough to accommodate the effect of jitter. In some embodiments, the equalized delay value is selected to be larger than or equal to the sum of (1) longest measured delay from the possible upstream sources (ENs) to the video engine and (2) the maximum expected jitter across the distribution network. FIG. 13 illustrates an example of setting equalized delay based on jitter and largest the measured delay between the distribution nodes and the video engine.

The setting of the equalized delay between the video engine and the distribution nodes is based on the largest measure delay and the possible jitter. As illustrated, the video engine receives packet from several distribution nodes, including ENs 131-134 through the distribution network 120. The system has measured delays for these ENs, where the delay from EN3 133 is the largest. The transmission through the distribution network 120 is subject to possible jitter of ±y. The equalized delay (QVE) at the video engine is therefore set to be larger than or equal to the maximum of the measured delays (Delay(EN3:VE)) plus the possible jitter y (i.e., $QVE \geq Delay(EN3:VE)+y$).

Figure 14:
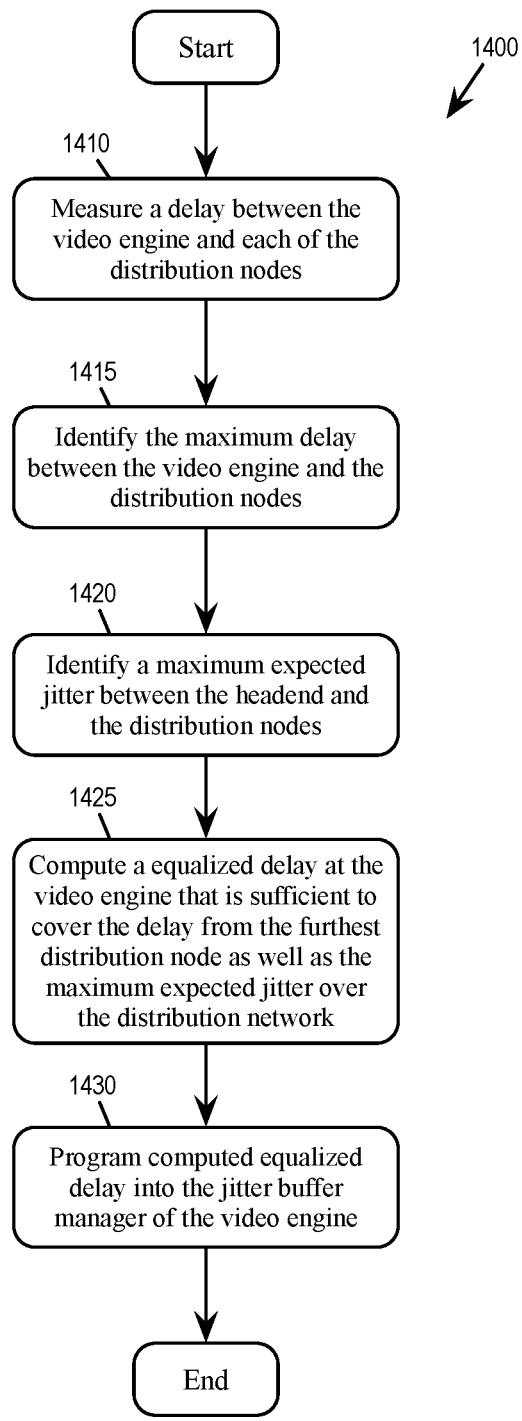
FIG. 14 conceptually illustrates processes for setting equalized delays at the video engine.

FIG. 14 conceptually illustrates a process 1400 for setting equalized delays at the video engine. In some embodiments, a controller of the CATV system (e.g., the controller 190) performs the process 1400. The process starts by measuring (at 1410) a delay for each of the distribution nodes, i.e., the amount of time it takes for a upstream packet to travel from the distribution node to the headend through the fiber/10 G network. The process then identifies (at 1415) the maximum of these measured delays between the video engine and the distribution nodes.

Next, the process identifies or measures (at 1420) a maximum expected jitter between the headend and the distribution nodes. The process then computes (at 1425) a equalized delay (i.e. QVE) at the video engine that is sufficient to cover the maximum of the measured delays (from the distribution nodes) as well as the identified maximum expected jitter over the distribution network. The process then programs (at 1430) the computed equalized delay into the jitter buffer manager of the video engine. The programmed equalized delay allows the jitter buffer manager (e.g., 1140) to schedule packet retrieval and transmission that would equalize delay and remove the effect of jitter. The process 1400 then ends.

III. Electronic System

Figure 15:
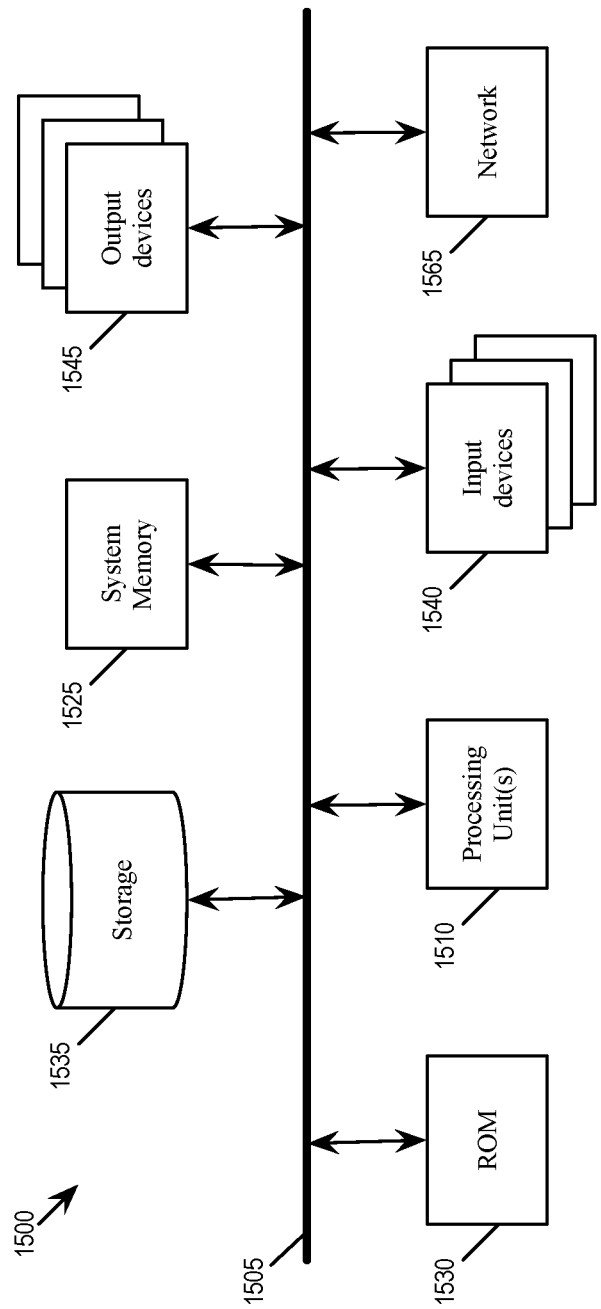
FIG. 15 conceptually illustrates an electronic system with which some embodiments of the invention are implemented.

FIG. 15 conceptually illustrates an electronic system 1500 with which some embodiments of the invention are implemented. The electronic system 1500 can be used to execute any of the control, virtualization, or operating system applications described above. The electronic system 1500 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1500 includes a bus 1505, processing unit(s) 1510, a system memory 1525, a read-only memory 1530, a permanent storage device 1535, input devices 1540, and output devices 1545.

The bus 1505 collectively represents all system, peripheral, and chipset buses that communicatively connect the numerous internal devices of the electronic system 1500. For instance, the bus 1505 communicatively connects the processing unit(s) 1510 with the read-only memory 1530, the system memory 1525, and the permanent storage device 1535.

From these various memory units, the processing unit(s) 1510 retrieves instructions to execute and data to process in order to execute the processes of the invention. The processing unit(s) may be a single processor or a multi-core processor in different embodiments.

The read-only-memory (ROM) 1530 stores static data and instructions that are needed by the processing unit(s) 1510 and other modules of the electronic system. The permanent storage device 1535, on the other hand, is a read-and-write memory device. This device is a non-volatile memory unit that stores instructions and data even when the electronic system 1500 is off. Some embodiments of the invention use a mass-storage device (such as a magnetic or optical disk and its corresponding disk drive) as the permanent storage device 1535.

Other embodiments use a removable storage device (such as a floppy disk, flash drive, etc.) as the permanent storage device. Like the permanent storage device 1535, the system memory 1525 is a read-and-write memory device. However, unlike storage device 1535, the system memory is a volatile read-and-write memory, such a random access memory. The system memory stores some of the instructions and data that the processor needs at runtime. In some embodiments, the invention's processes are stored in the system memory 1525, the permanent storage device 1535, and/or the read-only memory 1530. From these various memory units, the processing unit(s) 1510 retrieves instructions to execute and data to process in order to execute the processes of some embodiments.

The bus 1505 also connects to the input and output devices 1540 and 1545. The input devices enable the user to communicate information and select commands to the electronic system. The input devices 1540 include alphanumeric keyboards and pointing devices (also called "cursor control devices"). The output devices 1545 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 15, bus 1505 also couples electronic system 1500 to a network 1565 through a network adapter (not shown). In this manner, the computer can be a part of a network of computers (such as a local area network ("LAN"), a wide area network ("WAN"), or an Intranet, or a network of networks, such as the Internet. Any or all components of electronic system 1500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 12 and 14) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A distributed Cable Television (CATV) system comprising:
   a video engine;
   a packet engine for routing packets of the CATV system; and
   a set of distribution nodes that are located in field and remotely communicatively coupled with the video engine and the packet engine through a digital communications medium supporting digital packet traffic, each distribution node of the set of distribution nodes further are located remotely and communicatively coupled with a corresponding set of information consuming devices through a Radio Frequency (RF) communications medium, wherein the set of distribution nodes are remotely located from the video engine and the packet engine;
   wherein the video engine converts downstream video channel RF signals and downstream supplementary channel RF signals respectively into video downstream packets and supplementary downstream packets for the set of distribution nodes, wherein the video downstream packets and supplementary downstream packets include an Ethernet packet format;
   wherein each distribution node of the set of distribution nodes converts upstream supplementary channel RF signals received from its corresponding RF communications medium into supplementary upstream packets for transmission to the video engine at an out-of-band frequency, wherein the supplementary upstream packets include the Ethernet packet format, and wherein the distribution node samples the upstream supplementary channel RF signals at a first rate and reduces a number of samples according to a second rate that is lower than the first rate in order to minimize a size of the supplementary upstream packets;
   wherein each distribution node of the set of distribution nodes converts the supplementary downstream packets received from the video engine over the digital communications medium into corresponding downstream supplementary channel RF signals.

2. The distributed CATV system of claim 1, wherein the video engine and the packet engine are located at a headend of the distributed CATV system.

3. The distributed CATV system of claim 1, wherein the downstream supplementary channel RF signal carries information for at least one of program guides, channel lineups, and updated code images.

4. The distributed CATV system of claim 1, wherein the RF communications medium coupling a distribution node with its corresponding set of information consuming devices comprises a set of CATV cables, and the digital communications medium supporting packet traffic comprises optical fiber.

5. The distributed CATV system of claim 1, wherein the set of information consuming devices comprises a set of cable modems and a set of set-top-boxes.

6. The distributed CATV system of claim 1, wherein the packet engine is further for routing packets to and from a network that is external to the CATV system.

7. The distributed CATV system of claim 1, wherein the downstream supplementary channel RF signals are carried by RF waveforms at an out-of-band frequency, wherein the video engine samples the supplementary channel RF signals at a third rate and reduces a number of samples according to a fourth rate that is lower than the third rate in order to minimize a size of the supplementary downstream packets.

8. The distributed CATV system of claim 7, wherein each distribution node of the set of distribution nodes extracts downstream supplementary channel data from a received supplementary downstream packet and converts the extracted downstream supplementary channel data into out-of-band downstream RF signals over its corresponding RF communications mediums, wherein each distribution node of the set of distribution nodes creates the out-of-band downstream RF signals by up-sampling the extracted downstream supplementary channel data from the fourth rate to the third rate in order to create the supplementary RF signals at the out-of-band frequency.

9. The distributed CATV system of claim 1, wherein the video engine extracts upstream supplementary channel data from supplementary upstream packets received from the set of distribution nodes and converts the extracted supplementary channel data into out-of-band upstream RF signals for a controller of the distributed CATV system, wherein the video engine creates the out-of-band upstream RF signals by up-sampling the extracted upstream supplementary channel data from the second rate to the first rate in order to create the out-of-band upstream RF signals at the out-of-band frequency.

10. The distributed CATV system of claim 9, wherein each distribution node of the set of distribution nodes reduces the number of samples of the upstream supplementary channel RF signals by performing a sequence of decimation operations, wherein the video engine up-samples the extracted supplementary channel data by performing a corresponding sequence of interpolation operations that undo the effect of the sequence of decimation operations.

11. The distributed CATV system of claim 1, wherein the supplementary downstream packets to the set of distribution nodes are transmitted as multicast packets having a multicast address as destination address.

12. The distributed CATV system of claim 1, wherein the video engine comprises a programmable gain for adjusting a power level of the upstream supplementary channel RF signals to an out-of-band demodulator.

13. The distributed CATV system of claim 1, wherein each distribution node of the set of distribution nodes comprises a programmable gain for adjusting the power level of the downstream supplementary channel RF signals to match its corresponding set of information-consuming devices.

14. The distributed CATV system of claim 1, wherein each distribution node of the set of distribution nodes demodulates upstream signals received from its corresponding RF communications medium into symbols and correlates the demodulated symbols with a predetermined sequence of symbols in order to detect a start of a packet, wherein each distribution node of the set of distribution nodes enables the transmission of a upstream packet to the video engine when a start of packet is detected.

15. The distributed CATV system of claim 14, wherein each distribution node of the set of distribution nodes mutes its transmitter when no packet is detected.

16. A method for delivering data in a Cable Television (CATV) system comprising a headend, a set of distribution nodes, and a set of information consuming devices, wherein the set of distribution nodes are located remotely and communicatively coupled with the headend through a digital communications medium, wherein each distribution node of the set of distribution nodes is further communicatively coupled with a corresponding set of information consuming devices through a Radio Frequency (RF) communications medium, the method comprising:
at the headend:
receiving downstream video channel RF signals and converting the received downstream video channel RF signals into video downstream packets, wherein the video downstream packets are Ethernet packets;
receiving out-of-band RF signals from an out-of-band modulator and converting the received out-of-band RF signals into supplementary downstream packets, wherein the supplementary downstream packets are Ethernet packets, wherein converting the received out-of-band RF signals into supplementary downstream packets includes:
sampling the out-of-band RF signals at a first rate and reducing a number of samples according to a second rate that is lower than the first rate in order to minimize a size of the supplementary downstream packets; and
transmitting the video downstream packets and the supplementary downstream packets to the set of distribution nodes over the digital communications medium.

17. The method of claim 16, wherein the headend comprises a video engine for providing media content in the CATV system, wherein the video engine converts the received downstream video channel RF signals into video downstream packets and converts the received out-of-band RF signals into supplementary downstream packets.

18. The method of claim 16, wherein the downstream supplementary channel RF signal carries information for at least one of program guides, channel lineups, and updated code images.

* * * * *